3,191,014
MIXED CODE CALCULATOR
Robert I. Roth, Briarcliff Manor, and Harold Fleisher, Poughkeepsie, N.Y., assignors to International Business Machines Corporation, New York, N.Y., a corporation of New York
Filed Oct. 30, 1961, Ser. No. 148,346
9 Claims. (Cl. 235—175)

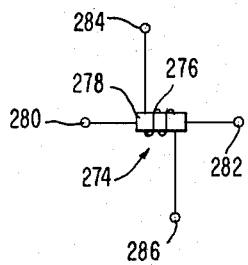
FIG. 2a
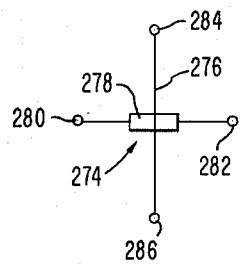
FIG. 2b
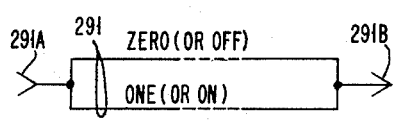
FIG. 2c
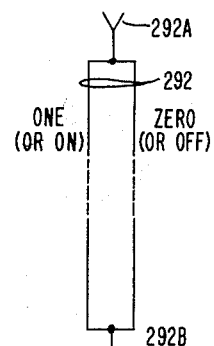
FIG. 2d
FIG. 4a
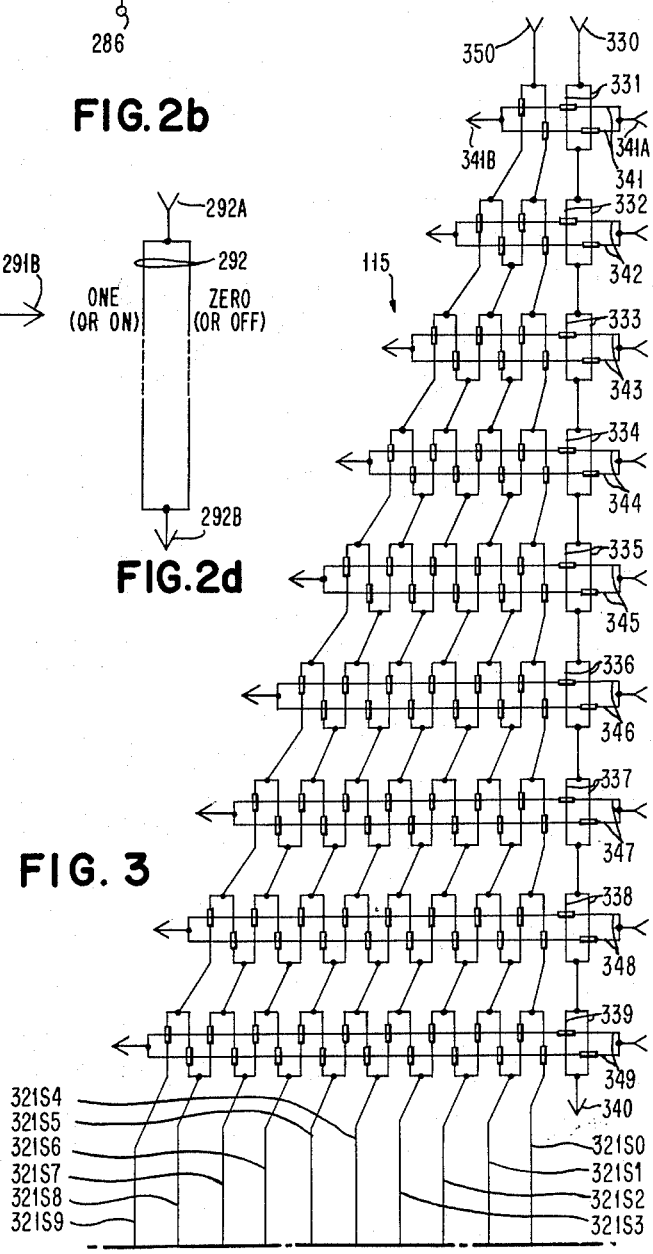
FIG. 3

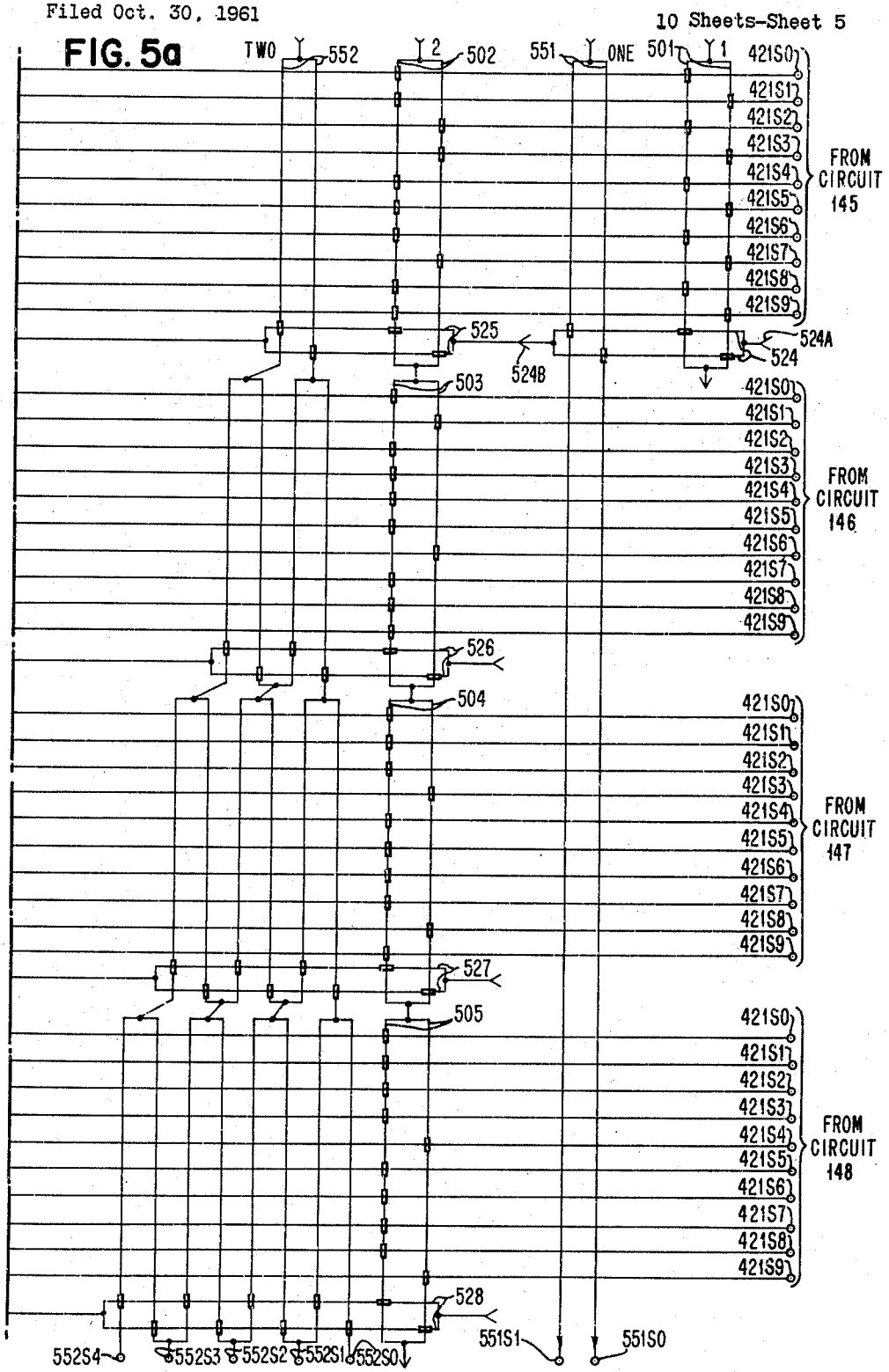

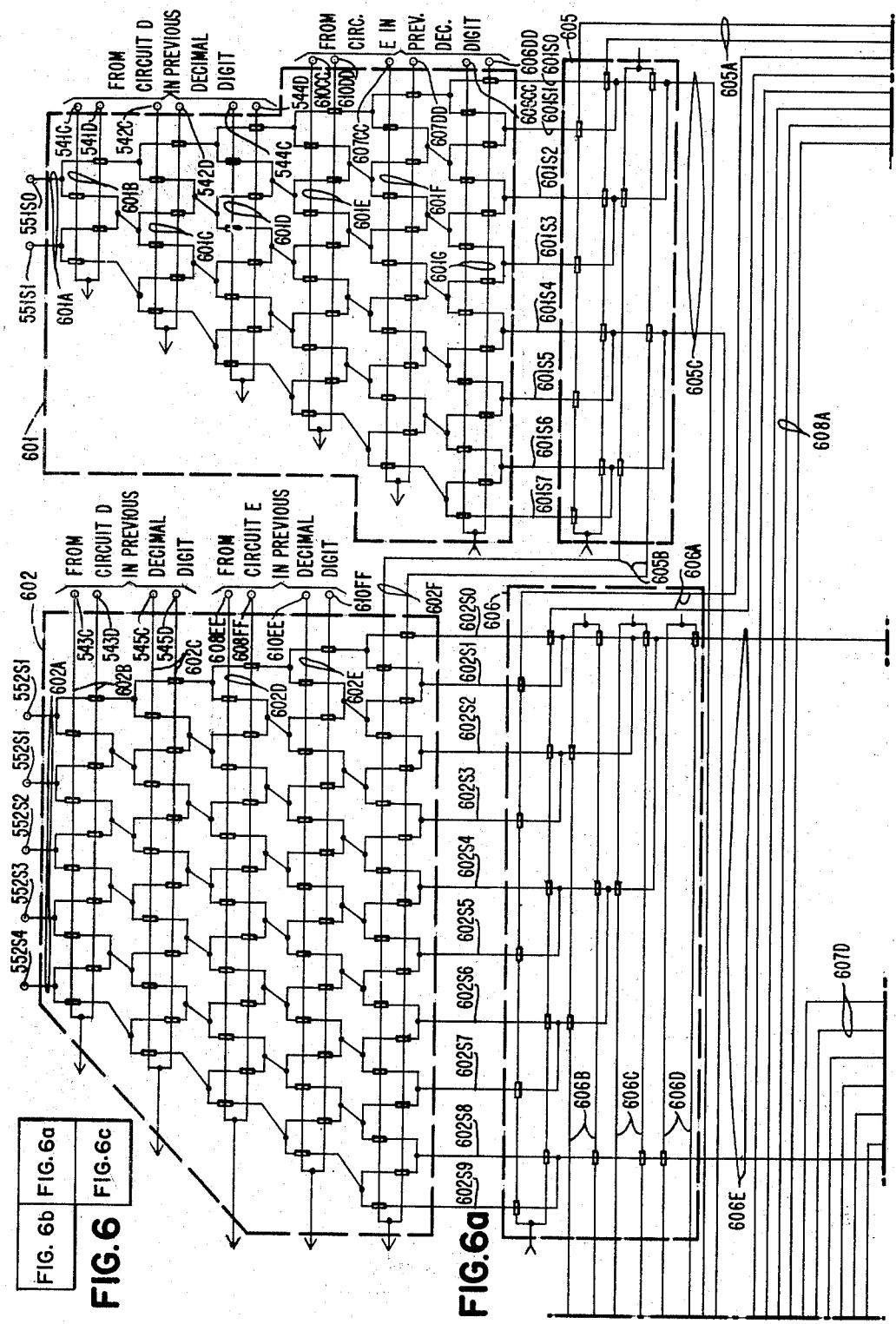

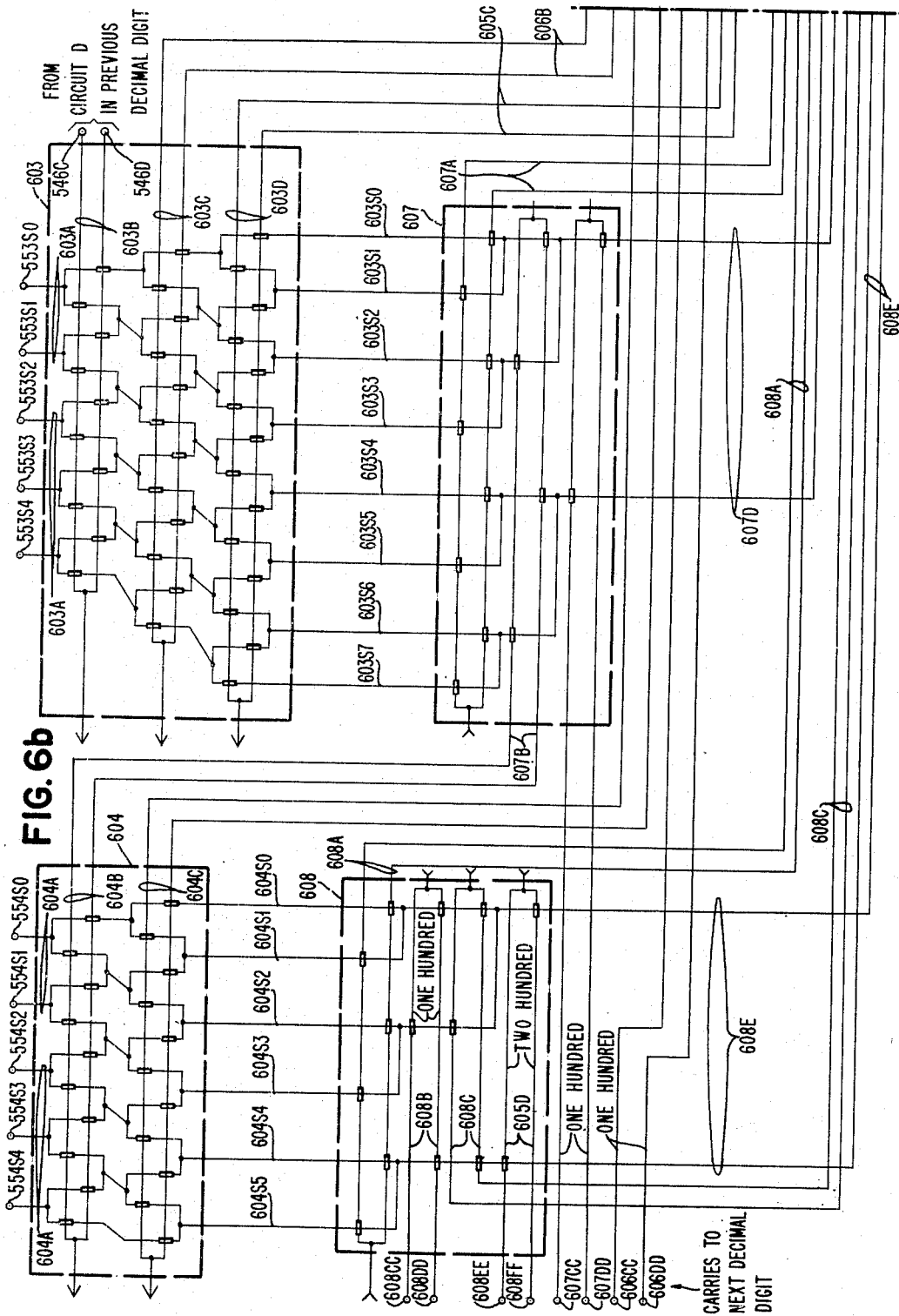

This invention relates to calculators and more particularly to carry propagation in devices for performing addition and translation.

In certain instances it is advantageous to represent numbers by a mixed code wherein each position of a first base is represented by a plurality of orders of a second base. For example, since ordinary business transactions are carried on with decimal numbers and since bistable elements lend themselves to the representation of binary information it is often advantageous to represent numbers in the well known binary coded decimal form wherein each decimal digit is represented by four binary orders. Representing numbers in mixed code form leads to two problems. The first problem is that of converting numbers from some other code form into mixed code from and vice versa, and the second problem is that of performing mathematical operations with numbers represented in mixed code form.

The present invention is directed at solving certain aspects of both of the above problems. First, the present invention provides a device to facilitate the conversion of numbers from the binary form into a mixed code form and second, the present invention provides an improved device for adding a plurality of numbers which are represented in a mixed code. The inventive novelty which is common to both the translating device and the adding device of the present invention is the means by which carries are handled.

In some respects numbers represented in a mixed code form may be handled as ordinary numbers; however, when two or more numbers which are represented in a mixed code are added, special provision must be made for handling the carries between orders. For example, in the binary coded decimal systems shown in the prior art the problem of carry propagation is handled indirectly by either converting the numbers to be added into purely binary form before addition and then reconverting them into binary coded decimal form after addition, or by performing a regular binary addition and then adding "six" to each four digit representation of a decimal sum digit. The addition of the "six" in each four digit representation of a decimal sum digit handles carry propagation since in the decimal form there is a carry between orders whenever the magnitude of the quantity in each order exceeds nine, whereas, when a regular binary addition is performed with numbers represented in binary coded decimal form, there is not a carry between the four binary digits which represent one decimal digit and the next four binary digits which represent the next decimal order unless the quantity in the first four binary digits exceeds fifteen. By adding six to each four binary digits which represent a decimal sum digit a carry is produced when the value in the four binary digits exceeds nine. Hence, carries are produced as required by the decimal addition.

The adding device of the present invention adds numbers which are represented in binary coded decimal form without first converting them into purely binary form and also without adding "six" in each decimal digital position in order to arrive at the correct result. With the present invention numbers represented in binary coded decimal form are directly summed and the correct result is produced in binary coded decimal form.

The present invention "batch processes" numbers represented in binary coded decimal form. That is, a plurality of numbers each represented in binary coded decimal form are simultaneously summed to produce a sum in binary coded decimal form. The numbers to be summed are divided into a first group of up to eighteen numbers and into subsequent groups of up to nine numbers each. Each binary order in each group of numbers is simultaneously added, there being no provision for the propagation of carries between either binary orders or between decimal digital positions until the end of the addition of each group of numbers. At the end of the addition of each group of numbers carries are propagated from the first binary order in the first decimal digit to the first binary order in the second decimal digit, from the second binary order in the first decimal digit to the secondary binary order in the second decimal digit, etc. No carries are propagated between adjacent binary orders. Each of the carries which is propagated is a decimal carry which has a value which is some multiple of ten depending upon the particular orders between which the carry propagates.

At the end of the addition of the last group of numbers, decimal carries are propagated as at the end of the addition of each previous group of numbers; however, there is still the possibility that the sum in each binary order in each decimal digit has a value of up to nine. Circuitry is provided decode this sum into carries which are propagated to other decimal positions and into the binary coded decimal sum digits for the various decimal digital positions. The last mentioned decoding is hereinafter referred to as the "final decoding" operation.

The final decoding operation is facilitated by a novel arrangement of decoding devices whereby the sum in each binary order of each decimal digit is first decoded into several decimal carries and the remainder is decoded into a "one," "two," "four," "six" and "eight" code representation. This remainder is then decoded into the binary coded decimal sum digits for the respective digital position plus other decimal carries.

The principles of the present invention are similarly applicable to handling carry propogation during the addition of numbers represented in mixed codes other than binary coded decimals. Furthermore, the principles of the present invention are applicable to the handling of carry propagation during the batch addition of a plurality of numbers which are represented in a normal single code such as a binary code.

Copending application Serial No. 79,823 entitled "Calculating Memory" filed December 30, 1960 by H. Fleisher and R. I. Roth shows a binary batch adder in which a plurality of numbers represented in binary form are summed. In the device shown in the referenced application, each time carries are propagated out of the particular order sufficient carries are propagated out of the particular order in order to reduce the sum in the particular order to either a "one" or a "zero." With the present invention carries are propagated out of each order at selected levels; however, the sum in each binary order is not necessarily reduced to a "one" or a "zero" at each place where carries are propagated to higher orders.

The novel translator of the present invention provides a device for converting numbers represented in binary form into numbers represented in a mixed code form. The translator utilizes the above described adding device.

The translator has means for storing a plurality of numbers and means for selectively reading these numbers out of memory into the previously described adding circuitry. The numbers which are stored represent the mixed code equivalents of the numbers which the various binary orders represent. For example, to convert binary numbers to binary coded decimal numbers the value of each binary order is stored in binary coded decimal form. The first binary order represents a one, hence the number "one" is stored in binary coded decimal form, the second binary digit represents a two and hence a two is stored in binary coded decimal form, the third binary digit represents a four, hence four is stored in binary coded decimal form. The fourth binary digit represents an eight, hence eight is stored in binary coded decimal form, the fifth binary digit represents sixteen, hence sixteen is stored in binary coded decimal form, etc.

The "ones" and "zeros" of the binary number which is to be translated into a binary coded decimal form are used to selectively readout various of the stored words from the memory into the adding device previously described. Each binary digit controls the readout of its respective representation in binary coded decimal form. For example, if the binary number which is to be translated into binary coded decimal from contains a "one" in its fifth order the number thirty-two which is stored in binary coded decimal form is read into the adding circuitry. In this manner the various binary coded decimal equivalents of the ones in the binary number which is to be translated are summed to produce the binary coded decimal equivalent of binary number.

An object of the present invention is to provide an improved means for handling carries in an adding device.

A further object of the present invention is to provide a binary coded decimal adding device capable of simultaneously adding a plurality of numbers represented in binary coded decimal form.

Still another object of the present invention is to provide an improved means for propagating carries in a device for adding numbers which are represented in a mixed code.

Yet another object of the present invention is to provide a binary coded decimal batch adder.

Yet another object of the present invention is to provide a simple, economical means for accommodating carries in a binary coded decimal adder.

Another object of the present invention is to provide an improved translating device.

Yet another object of the present invention is to provide an improved device for translating binary numbers into binary coded decimal numbers.

The foregoing and other objects, features and advantages of the invention will be apparent from the following more particular description of preferred embodiments of the invention as illustrated in the accompanying drawings.

In the drawings:

FIGURES 2a and 2b show cryotron gates and controls.

FIGURES 2c and 2d show representative loop circuits.

FIGURE 3 shows the adding tree for one binary order of the first nine numbers.

FIGURE 4a shows how FIGURES 3 and 4 fit together.

Figure 5C:
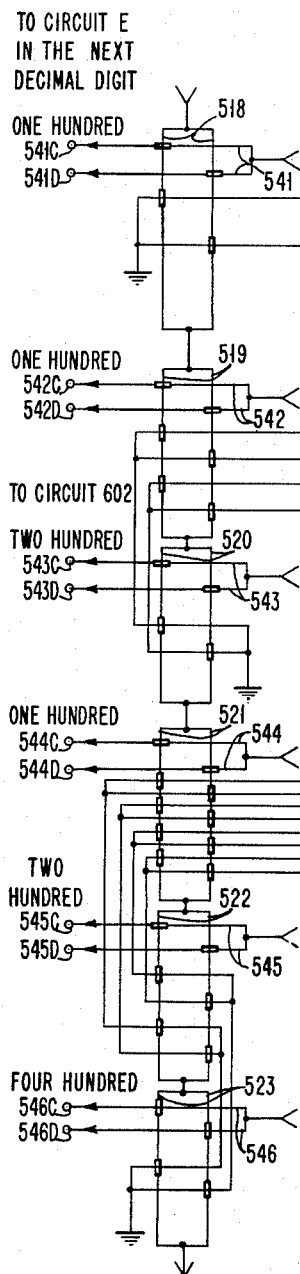
Figure 5C:
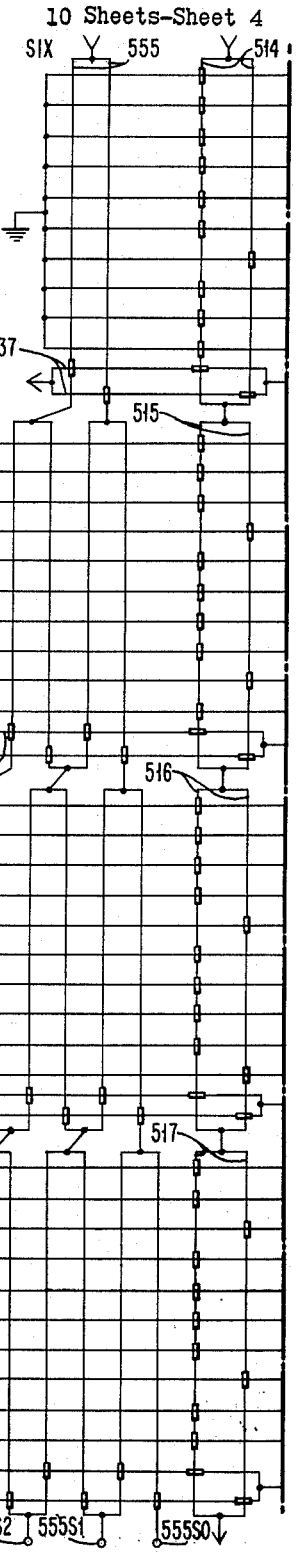
Figure 5B:
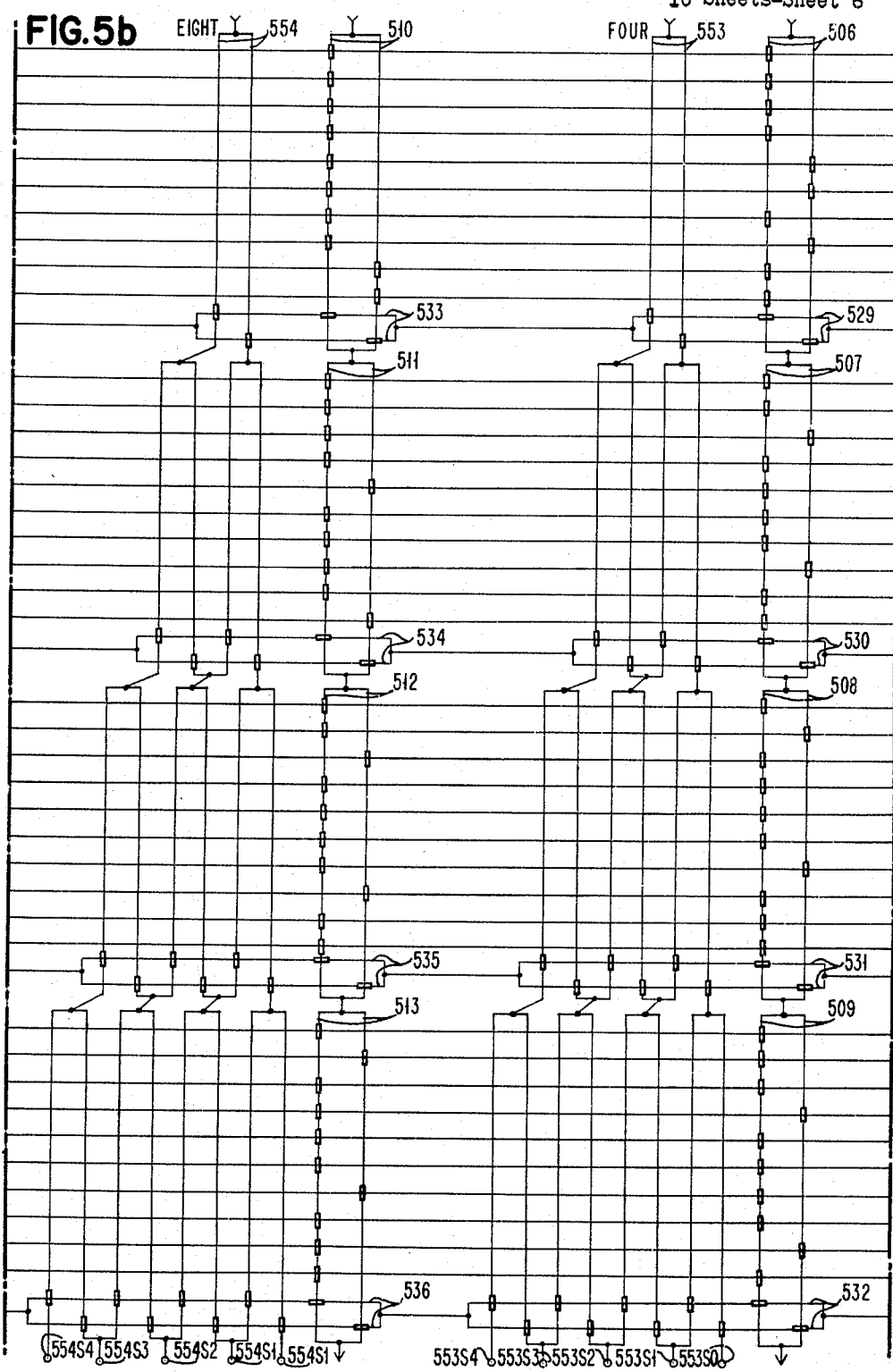

FIGURES 5a, 5b and 5c (which fit together as shown in FIGURE 5) show the first level decoding matrix for one decimal order.

Figure 6C:
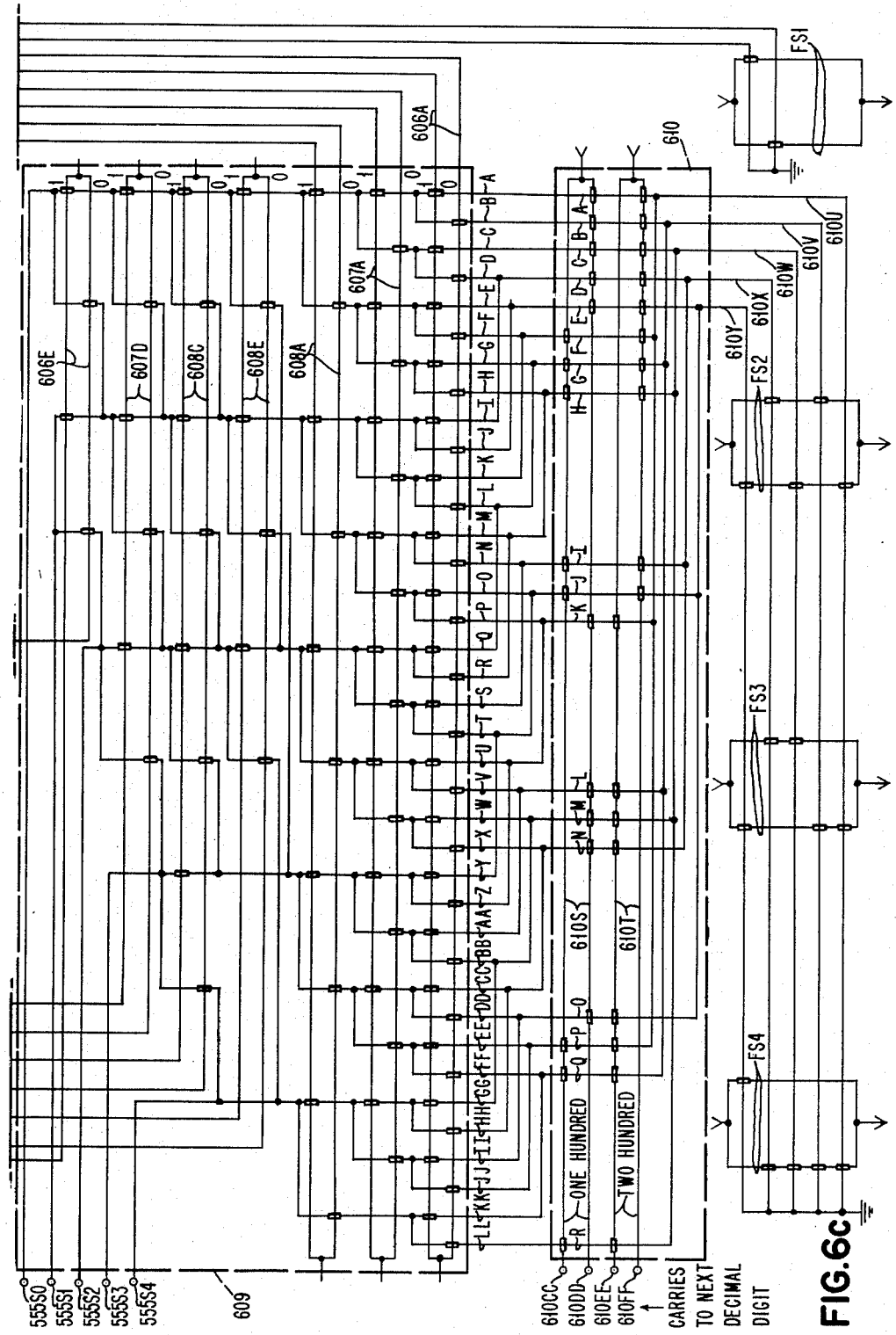

FIGURES 6a, 6b and 6c (which fit together as shown in FIGURE 6) show the second level decoding matrix for one decimal order.

Figure 7:
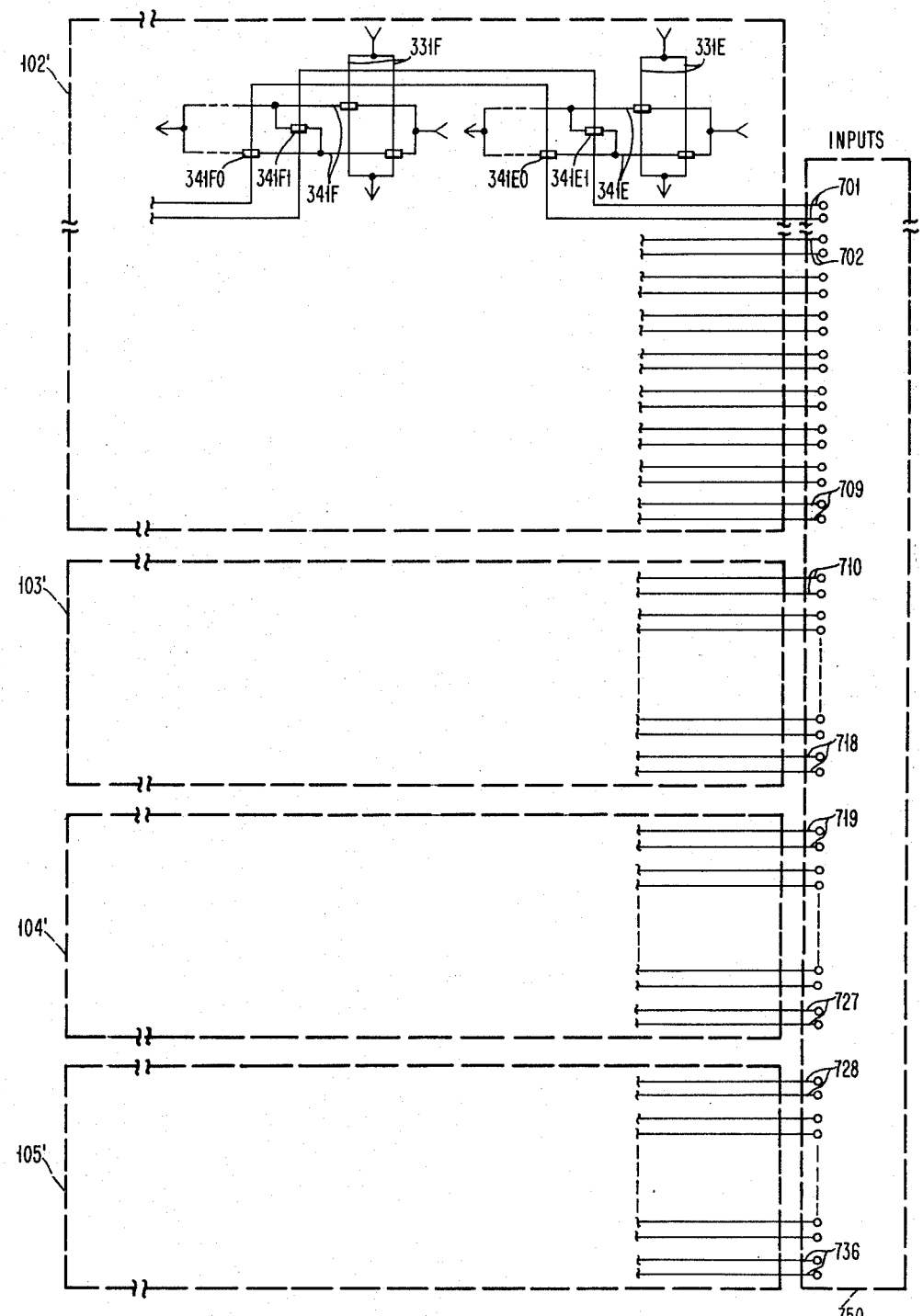

FIGURE 7 shows the details of the memory readout circuitry for an embodiment of the invention as a translator.

Figure 1:
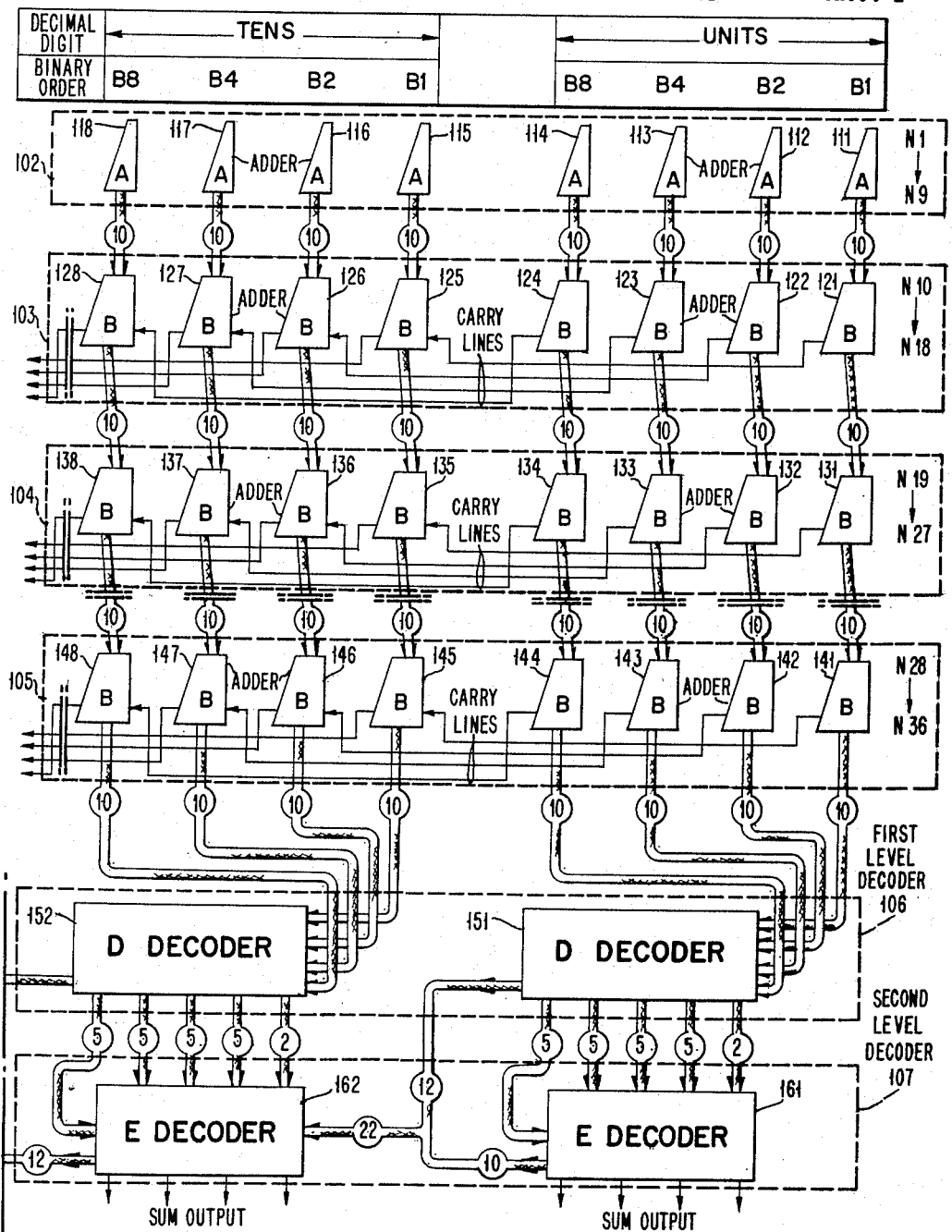
FIGURE 1 shows an overall block diagram of a first preferred embodiment of the invention as an adding device.

The general organization of the first preferred embodiment of the invention is shown in FIGURE 1. The first preferred embodiment of the invention is an adding device which sums thirty-six numbers N1 to N36, each of which includes several decimal digits represented in binary coded decimal form. Only the circuitry associated with two decimal digits, the units and tens digits is shown in FIGURE 1. The other decimal digits and corresponding binary orders of the various numbers are a duplication of the two decimal digits and eight binary orders shown.

The first preferred embodiment of the invention as shown in FIGURE 1 has four adding circuits 102, 103, 104 and 105 and two decoding circuits 106 and 107. Circuit 102 adds numbers N1 to N9, circuit 103 adds numbers N10 to N18, circuit 104 adds numbers N19 to N27 and circuit 105 adds numbers N28 to N36. The decoding circuits 106 and 107 decode the sum produced by adding circuit 105 into the sum digits and into decimal carry digits to higher decimal orders.

Circuit 102 has an adding circuit A for each binary order in the units decimal digit and an adding circuit A for each binary order in the tens decimal digit. Circuits 103, 104 and 105 have an adding circuit B for each binary order in the units decimal digit and an adding circuit B for each binary order in the tens decimal digit. Each adding circuit A and each adding circuit B adds the nine associated binary digits of the nine associated numbers. For example, adding circuit 111 adds the first binary digit of the numbers N1 to N9 and the adding circuit 121 adds the first binary digit of the numbers N10 to N18. Each of the adding circuits A and each of the adding circuits B have ten output lines, signals on which respectively represent sums of from zero to ten. The ten output lines from each adding circuit A and from each adding circuit B are not individually shown in FIGURE 1, instead a cable is shown with the numeral "10" therein to indicate that it contains ten lines.

The sum output from each adding output A in circuit 102 is used as an input to the adding circuit B in the corresponding binary order in circuit 103. The output from each adding circuit B in circuit 103 is used as an input to the adding circuit B in the corresponding binary order of adding circuit 104. The ten outputs from each adding circuit B and circuit 104 are used as inputs to the adding circuit B in the corresponding binary order of adding circuit 105. The ten outputs from each adding circuit B in circuit 105 are used as inputs to decoding circuit 106.

No carries propagate between the adding circuits A which are located in circuit 102. The adding circuits B located in circuits 103, 104 and 105 do have provision for progapating carries. The manner in which carries are propagated in circuits 103, 104 and 105 will now be explained.

The first binary order in the second decimal digit has a value which is ten times as great as the value of the first binary order in the first decimal digit. Likewise, the second binary order in the second decimal digit has a value ten times as great as the second binary order in the first decimal digit, etc. Stated generally, each binary order has a value which is ten times the value of the corresponding binary order in the next lower decimal digit.

The addition of "one" in the first binary order in the second decimal digit of a number represented in binary coded decimal form is equivalent to the addition of ten to the number, the addition of "one" in the second binary order to in the second decimal digit of a number is equivalent to the addition of twenty to the number. The summation of ten ones in the first binary order of the first binary digit has a valve of ten, and hence a carry of "one" into the first binary order of the second decimal digit is justified. Likewise, the summation of ten ones in the second binary order of the first decimal digit has a value of twenty, and this is eqiuvalent to a carry of "one" into the secondary binary order to the second decimal digit where the addition of "one" has a value of twenty.

Each circuit B in circuits 103, 104 and 105 can generate a carry which has a value which is ten times the value of the associated binary order. This carry is propagated into one of the binary orders of the next decimal digit which has a value equal to the value of this carry. For example, circuit 121 propagates a carry into circuit 125, circuit 122 propagates a carry into circuit 126, circuit 123 propagates a carry into circuit 127, circuit 124 propagates a carry into circuit 128, circuit 131 propagates a carry into circuit 135, etc.

The general operation of the device will now be explained with reference to FIGURE 1. Each of the A circuits in circuit 102 sums the nine associated digits of the numbers N1 to N9. The output from each of the A circuits in circuit 102 is supplied as an input to the B circuit associated with the same binary order in circuit 103. Each B circuit in circuit 103 adds the sum which it receives from an A circuit in circuit 102 to the nine binary digits in the associated binary order of words N10 to N18. Each B circuit associated with the tens decimal digit also includes in its sum a carry signal. The sum produced by each B circuit is indicated in two ways. First, each B circuit can produce a carry output signal having a value ten times the value of the associated order and each B circuit also has ten sum lines which respectively indicate sums of from zero to nine. Each of the B circuits in circuits 104 to 105 is identical to the B circuits in circuit 103 except that the B circuits in circuits 104 and 105 are respectively associated with numbers N19 to N27 and N28 to N36.

The sum output after carries have been propagated from the B circuits in circuit 105 are decoded into decimal carries into higher order digits and into the final sum digits by the D and E decoding circuits 151, 152, 161 and 162 in circuits 106 and 107. Each decimal digital position has a decoding circuit D in circuit 106 which receives inputs from the four B circuits in circuit 105 which are associated with the same decimal digital position as the respective D circuit. Hence, each decoding circuit D has forty input lines, only four of which (one from each binary order) are active at any one time.

The sum output lines from the four B circuits in each decimal digital position in circuit 105 respectively indicates counts of from zero to nine "ones," "twos," "fours" and "eights." Naturally, these counts are multiples of the decimal values of the particular decimal digit with which the particular B circuits are associated. Each D circuit receives this indication of a particular number of "ones," "twos," "fours" and "eights" and decodes the number represented thereby into decimal carries and into an indication of a particular number of "ones," "twos," "fours," "sixes" and "eights." Again it should be noted that the outputs to each decoding circuit D represent multiples of the value of the particular decimal digit with which they are associated.

Each decoding circuit D has five sets of output lines which go to the decoding circuit E which is associated with the same decimal digital position. Decoding circuit 151 has five sets of output lines 151A to 151E and decoding circuit 152 has five sets of output lines 152A to 152E. Sets of lines 151A and 152A have two lines which indicate either "zero" or one "one." Sets of lines 151B to 151E and 152B to 152E each have five lines which respectively i dicate counts of from zero to four "twos," "fours," "sixes" and "eights."

One of the features of the present invention which considerably simplifies decoding circuits D and E is the concept of first decoding the outputs which indicate a particular number of "ones," "twos," "fours," and "eights" into a number of decimal carries and an indication of a number of "ones," "twos," "fours," "sixes" and "eights." It should further be noted that the decoding scheme disclosed herein is not similar to the decoding schemes which add "six" in each decimal digit in order to arrive at a binary coded decimal result. No corrective factor is added to the sums generated by circuits A and B in the present invention. Instead decoder D merely receives sums which are represented as a number of "ones," "twos," "fours" and "eights" and decodes this representation into a number of decimal carries and into signals representing a number of "ones," "twos," "fours," "sixes" and "eights."

There is a decoding circuit E in circuit 107 for each decimal digital position. The various decoding circuits E receive inputs from the decoding circuit D in the same digital position and from the decoding circuits D and E in the previous digital position.

The inputs which decoding circuit E receives from the decoding circuit D in the same digital position are signals representative of counts of "ones," "twos," "fours," "sixes" and "eights." The inputs which each decoding circuit E receives from lower order decoding circuits D and E represent decimal carries which have a value which is some multiple of the decimal digit with which the particular circuit is associated. It should be recalled, however, that although the inputs which each decoding circuit E receives represent a number of "ones," "twos," etc., each "two" in the second digital position is equivalent to twenty; each "four" is equivalent to forty and each "six" is equivalent to sixty. Hence, a carry from the first digital position which has a value of twenty merely need increment the count of "twos" in the second digital position by one.

The final sum of the numbers N1 to N36 is generated in binary coded decimal form by the second level decoding circuits E. Each decoding circuit E produces the four binary digits which represent the decimal digit of the sum in the associated digital position.

The details of the circuitry within blocks A, B, D and E will now be explained in detail. The particular detailed circuitry shown herein utilizes cryogenic gating elements to form the various circuits. It should be understood, however, that other technologies such as transistors, photological devices, electron tubes, diode matrices, etc. could be used to embody the detailed circuitry. Furthermore the various blocks A, B, D and E could be mechanical counting devices instead of the electronic devices shown herein.

The cryogenic devices with which the invention is herein shown embodied are well known in the art. Furthermore, some of the circuitry shown herein such as the various "adding trees" which are shown have been previously described in other patent applications, for example in application Serial No. 79,823 filed December 30, 1960, entitled "Calculating Memory" which has the same inventors and the same assignee as the present invention. Hence, in general the explanation of such circuitry given herein merely covers those points specifically related to the present invention.

For ease in explanation and to decrease the length of explanation and the number of drawings needed, only the circuitry for the various blocks in the tens digital position is shown and explained. The circuitry for higher order digital positions is almost identical to the circuitry shown in detail and the circuitry for lower order digital positions could be made identical. Naturally, since there are no carries into the lower order digital positions the circuitry in the lower order position can be simplified by eliminating the circuitry needed to assimilate input carries. Since all of the A circuits and all of the B circuits which are associated with the tens decimal digit are identical, only one of one each is shown and explained in detail herein.

In order to facilitate reference between the drawings and the specification the following numbering scheme has been used insofar as possible. The various components in the figures have been designated by three digit numerals. The number in the hundreds digit of this numeral designates the particular figure in which the component is shown. For example, component 341 is shown on FIGURE 3. Where one circuit has several related parts, these parts have been designated by the same numeral followed by either a letter or possibly a letter and a numeral. The letter or the letter and the numeral which follows any three digit designation has been chosen so as to be as meaningful as possible. For example, circuit 115 (shown in FIGURE 3) has ten outputs, signals on which respectively designate sums of from zero to nine. Hence, these ouputs have been designated by the numerals 361S0, 361S1, 361S2, 361S3, . . . 361S9 respectively designating that the various outputs are associated with sums of from zero to nine. Where two circuits have parts which have similar functions, insofar as possible, these parts have the same letter designation. For example, the inputs of circuit 601 and 602 are designated 601A and 602A.

CRYOTRON GATING ELEMENTS (FIGURES 2a AND 2b)

The term "cryotron" as used in the description of the embodiment of the present invention refers to cryogenic gating devices composed of materials which are said to be normally superconductive when maintained at very low temperatures such as may be achieved by immersion in liquid helium, for example. These cryotron gating devices include a main or gate conductor of superconductive material and a separate control conductor arranged such that when a current is provided in the control conductor, it is effective to produce a magnetic field which causes the gate conductor to become resistive.

FIGURE 2a illustrates such a cryotron device 274 having a control winding 276 around a gate element 278. The current to be gated or controlled flows through the gate element 278 between therminals 280 and 282, while the control current which causes the gating action flows through the winding 276 between terminals 284 and 286.

In FIGURE 2b the cryotron of FIGURE 2a is illustrated in a simplified form, the same reference numerals being employed to designate corresponding parts. It is to be seen that the only difference is that the winding 276 is represented in FIGURE 2b simply by a conductor disposed across gate element 278. This simplified representation of a cryotron is employed in all of the remaining figures which show cryogenic embodiments of the present invention. In these systems the circuit lines or wires and the control conductor or winding 276 of each cryotron may be composed of a so called "hard" superconductor material such as niobium or lead. On the other hand, the gate element 278 of each cryotron is composed of a "soft" superconductor material such as tantalum or tin, for instance. The current employed is such that the current in the control winding 276 creates a magnetic field which exceeds the critical field value to cause the gate to become resistive, but the field does not exceed such a critical value with respect to the material of the control winding 276 and the interconnecting lines and wires, so that these elements remain substantially superconductive.

When two gate conductors are electrically connected in parallel one being superconducting and the other being resistive, a current flowing to the parallel combination flows entirely through the superconducting gate, although the other gate may exhibit only a few tenths of an ohm resistance. Thus, if the resistive gate is allowed to become superconducting, the current will continue to flow through the original superconducting gate. Thus, current is caused to flow through a selected path which is maintained superconducting and such current will continue to flow in that path even though other parallel paths later become superconducting. The above is herein referred to as a storage loop or as a flip-flop circuit.

It is to be understood that the cryotron devices may be constructed of thin films such as are shown and described in copending application Serial No. 625,512 filed November 30, 1956 by R. L. Garwin and entitled "Fast Cryotrons" and assigned to the assignee of the present invention.

The cryotron gating devices may also be in-line cryotrons such as those disclosed in application Serial No. 112,373 filed by Brennemann and Meyers on May 24, 1961 entitled "Superconductive Storage Circuits" and assigned to the assignee of the present invention. The cryotron gating devices which are used to embody the invention form no part of the present invention and any of the cryotron gating devices known in the art may be used.

LOOP CIRCUITS (FIGURES 2c AND 2d)

The present invention utilizes a large number of loop circuits each of which comprises two superconducting paths connected between a current input wire and a current output wire. Each of the current paths has connected in series therewith means for introducing resistance into the path such that the current flowing between the current input wire and the current output wire can be directed into a selected one of the current paths. Once current is flowing in one of the current paths, the current will continue to flow in the particular current path until resistance is introduced into the path.

Each loop circuit therefore has two stable states. In the first stable state, current is flowing through the first current path and in the second stable state current is flowinng through the second current path. The first of these stable states can be used to represent a binary "one" condition and the second stable state can be used to represent the binary "zero" condition. The two stable states of a loop circuit can likewise be used to indicate the "on" and "off" condition of a particular output or input.

In order to facilitate an understanding of the invention the following conventions have been adopted. The loop circuits are either shown in a horizontal or in a vertical condition. When the loop circuits are shown in the horizontal condition as shown in FIGURE 2c, current in the upper path indicates a "zero" or "off" condition, and current in the lower path indicates a "one" or "on" condition. When the loop circuits are shown in a vertical condition such as shown in FIGURE 2d current in the left-hand path indicates a "one" or "on" condition and current in the right-hand path indicates a "zero" or "off" condition. In a few places (i.e., in circuit 609 shown in FIGURE 6c) the above convention has not been followed; however, where the above convention is not followed the departure is shown on the drawings and explained in the specification.

The current input wires and the current output wires for the various loop circuits are indicated by open arrows and designated by the same numeral as the loop circuit followed by a capital letter. For example, the loop circuit 291 shown in FIGURE 2c has a current input wire 291A and a current output wire 291B and the loop circuit 292 shown in FIGURE 2d has a current input wire 292A and a current output wire 292B.

The various current inputs and current outputs are not each separately labeled in all the drawings. The open arrow symbols shown and labeled in FIGURE 2c and 2d and explained above are used in the other drawings to represent current inputs and current outputs. Each time an open arrow is used it indicates a current input which supplies a constant flow of current. Naturally, each current input has an associated current output adapted to receive the constant flow of current. The current inputs and current outputs for the various loop circuits can alternatively be called current sources and current sinks. Appropriate devices which can supply constant currents to the current inputs of the various loop circuits are well known in the art and no discussion thereof is given herein.

ADDING CIRCUIT "A" (FIGURE 3)

Each of the adding circuits A is identical to the adding circuit 115 shown in detail in FIGURE 3 and the following description is directed in particular to the adding circuit shown in FIGURE 3; however, it is equally applicable to each of the other adding circuits A. Circuit 115 generates the sum of the first binary order of the tens decimal digit of the nine numbers N1 to N9. The circuit has ten output lines, 321S0 to 321S9, each of which designates a different sum. Only one output line is active at any one time and the particular output line which is active is dependent upon the condition of the inputs to the circuit at the particular time.

The nine binary digits which are summed by circuit 115 are stored in storage loops (or flip-flops) 331 to 339 which are connected in series between current input wire 330 and current output wire 340. A constant current flows between current input wire 330 and current output wire 340. Each of the storage loops 341 to 349 has two branches hereinafter designated as the right branch and the left branch. A "one" is stored in any particular persistent current loop by shifting current in the particular persistent current loop to the left-hand branch by introducing resistance into the right-hand branch. Resistance is introduced into the right-hand branch by an input cryotron which is not shown herein since such circuitry is well known and since it would unnecessarily clutter the drawings.

Each of the storage loops 341 to 349 has associated therewith a readout loop respectively designated as readout loops 341 to 349. Each readout loop has an upper and a lower branch connected between a current input wire and a current output wire. For example, readout loop 341 has a current input wire 341A and a current output wire 341B. If a "one" in stored in the storage loop associated with the respective readout loop, a readout current applied to the current input wire of the readout loop is diverted through the bottom path of the respective readout loops and if a "zero" is stored in the loop a current applied to the current input wire of the loop is diverted into the top branch of the respective loop.

The various readout loops 341 to 349 each in turn control a plurality of cryotrons which control the current in an adding tree. The adding tree has one current input wire 350 and a plurality of possible paths for the current from input wire 350 to take through the adding tree. The particular path which is established through the adding tree from input wire 350 is dependent upon whether the the current is in the top or bottom branch of the various readout circuits 341 to 349.

The current from current input 350 has two possible paths across the first readout loop 341, four possible paths across the second readout loop 342, six possible paths across the third readout loop 343, etc. Current in the upper branch of any particular readout loop activates a cryotron gate to block half of the current paths across the respective readout loop and current in the bottom half of the respective readout loop activates cryotron gates to block the other half of the current paths across the respective readout loop. As current from current input 350 arrives at each memory readout loop it has two possible paths, and the particular path which the current takes across any particular readout loop is determined by whether current is in the upper or lower branch of the respective readout loop.

If all of the storage loops 341 to 349 are in the "zero" condition when a read current is applied to the current input wire of readout loops 341 to 349, the current in each readout loop is in the top branch thereof and a current path is therefore established from current input 350 to output line 321S0. If one out of the nine current loops 341 to 349 is in the "one" condition when a readout current is applied to the current input wire of the readout loops 341 to 349, the current in all of the readout loops is in the top branch of each of the associated readout loops except for the one memory readout loop associated with the particular storage loop wherein a "one" is stored. In this particular memory readout loop the current is in the bottom branch and therefore the cryotron gates in the paths which cross the particular loops are conditioned such that the current from current input 350 is shifted one line to the left and hence an output is produced on output line 321S1. In a similar manner if there are nine "ones" stored in the storage loops 341 to 349 there is current in the bottom branch of each of the readout loops 341 to 349, and hence the current from current input 350 is shifted one position to the left as it crosses each readout loop and it finally activates line 321S9. It can therefore be seen that the particular one of the ten output lines 321S0 to 321S9 which is activated depends upon the number of "ones" stored in the various storage loops 341 to 349.

ADDING CIRCUIT B (FIGURE 4)

Figure 4:
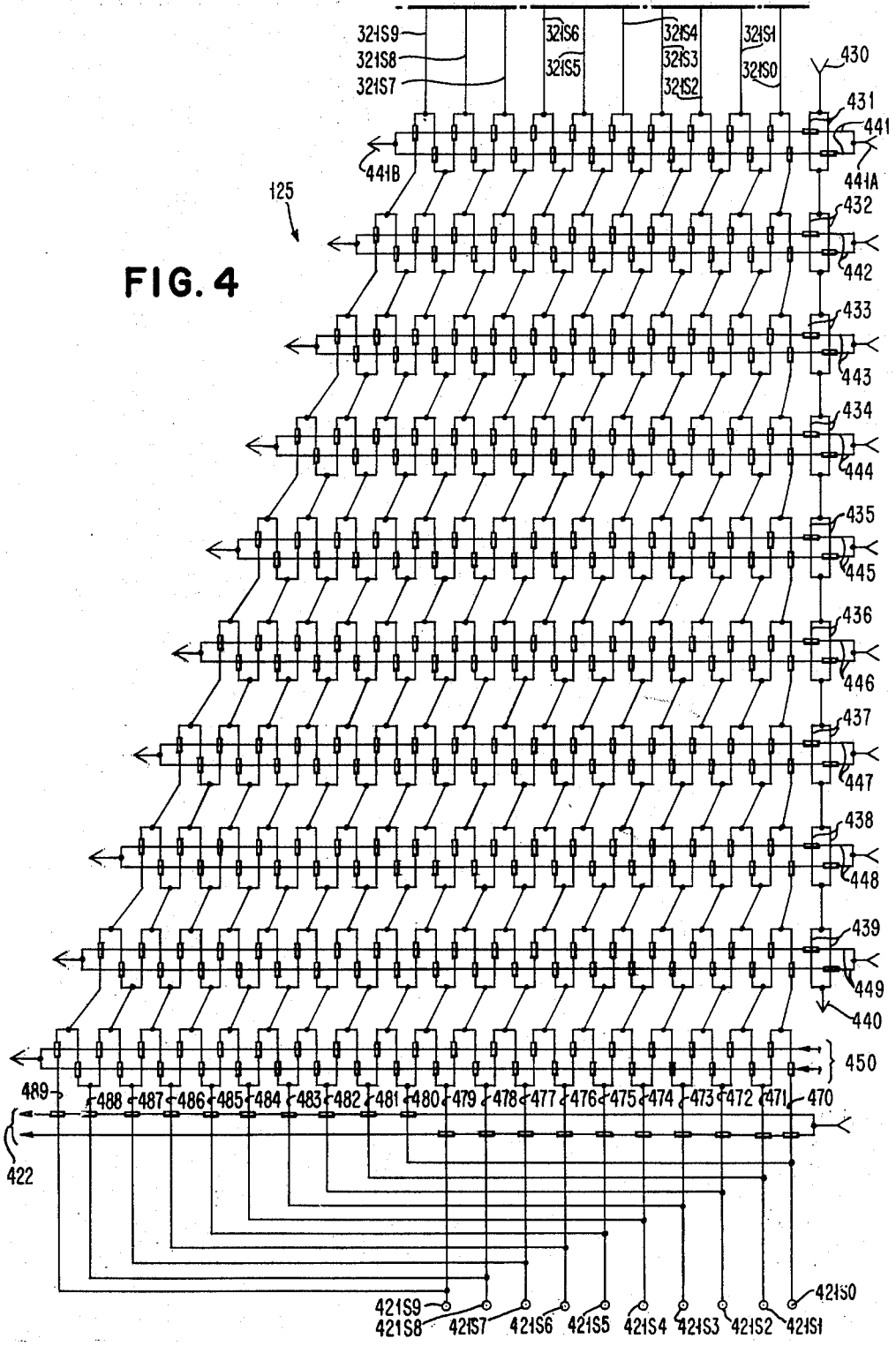
FIGURE 4 shows the adding tree for one binary order of the second nine numbers.

Each of the adding circuits B is identical to the adding circuit 125 shown in detail in FIGURE 4. The following description is directed in particular to the adding circuit 125 shown in FIGURE 4; however, except for references to particular binary digital positions the description is applicable to any one of the other adding circuits B.

Circuit 125 generates the sum of (1) the first binary order of the tens decimal digit of the nine words N10 to N18, (2) nine inputs 321S0 to 321S9 from circuit 115 and (3) a carry input 450. Circuit 125 has ten sum outputs 421S0 to 421S9 and a carry output 422. The nine binary digits (i.e., the first binary order of the tens decimal digit of the nine words N10 to N18) which are summed by circuit 400 are stored in nine storage loops 431 to 439 which are connected in series between current input wire 430 and current output wire 440. A constant current flows between current input wire 430 and current output wire 440. Each of the storage loops 431 to 439 has two branches hereinafter designated as the right branch and the left branch. A "one" is stored in any particular storage loop by shifting the current in the particular storage loop to the left-hand branch in the well known manner (not shown). Current in the top branch of carry input loop 450 indicates the presence of a carry and current in the bottom branch thereof indicates the absence of an input carry. Carry input 450 is the carry output 422 of adder circuit 121 and is the means by which a carry from circuit 121 is assimilated into the output of circuit 125.

It should be noted that in FIGURE 1 in the interest of clarity of illustration the carry input loops similar to loop 450 are shown by a single line.

Each of the storage loops 431 to 439 has associated therewith a readout loop respectively designated as readout loops 441 to 449. Each readout loop has an upper branch and a lower branch connected between a current input wire and a current output wire. For example, readout loop 441 has a current input wire 441A and a current output wire 441B. If a "one" is stored in the storage loop associated with the respective readout loop, a readout current applied to the current input wire of the particular readout loop is diverted through the bottom half of the respective readout loop.

The various readout loops 441 to 450 each in turn controls a plurality of cryotrons which control an adding tree. The adding tree has ten possible sources of current, current input lines 321S0 to 321S9. Only one of the current input lines 321S1 to 321S9 supplies current at any one time, the particular one depending upon what output of adding tree circuit 115 is active. There are a plurality of possible current paths between each current input and the various output lines. One particular path is established from each current input through the adding tree depending upon whether the current is in the top or the bottom of the various readout loops 441 to 450.

Circuit 125 generates the sum of the various inputs in a one out of eighteen code on the eighteen provisional sum lines 470 to 489. The particular provisional sum line 470 to 489 which is activated is dependent upon which of the input lines 321S0 to 321S9 is activated, the number of ones stored in the storage loops 431 to 439 (i.e., whether current is in the top or bottom branch of readout loops 441 to 449) and whether the carry input 450 is one or zero. Current from the particular input line which is activated is shifted one position to the left by each of the loops 441 to 450 which has current in its bottom half.

Once the provisional sum lines 470 to 489 are activated to indicate that sum in a one out of eighteen code, this sum is decoded into a decimal carry output 422 and into a one out of ten sum code on the ten sum output lines 421S0 to 421S9. Each of the first nine provisional sum lines 470 to 479 does not generate a carry and each of the second nine provisional sum lines 480 to 489 does generate a carry output. In addition to generating a carry, each of the second nine provisional sum lines 480 to 489 also activates one of the sum output lines 421S0 to 421S9.

DECODING CIRCUIT "D" (FIGURE 5)

Each of the first level decoding circuits D is identical to the decoding circuit 152 shown in detail in FIGURES 5a, 5b and 5c. The following description is directed in particular to the adding circuit 152 shown in detail in FIGURES 5a, 5b and 5c; however except for references to particular digital positions it is equally applicable to each of the other decoding circuits D.

Decoding circuit D receives the sum outputs 421S0 to 421S9 from the four adding circuits B associated with the tens decimal digit. These circuits are numbered 145, 146, 147 and 148 in FIGURE 1. Circuit 152 has forty input lines (see FIGURE 5a) only four of which are active at any one time. The particular input lines which are active represent a particular number of "tens" (i.e., the sum in the first binary order in the tens decimal digits) a particular number of "twenties" (i.e., the sum in the second binary order in the tens decimal digit), a particular number of "forties" (i.e., the sum in the third binary order in the tens decimal digit) and a particular number of "eighties" (i.e., the sum in the fourth binary order in the tens decimal digit) which together represent the sum left in the tens decimal digit after each circuit B associated with the tens decimal digit propagates carries to higher orders as previously described.

Decoding circuit 152 generates two different categories of outputs. The first category of outputs generated by circuit 152 are the decimal carries which respectively have values of one hundred, two hundred and four hundred. Circuit 152 generates the carry outputs at terminals 541C and 541D to 546C and 546D (see FIGURE 5c). These decimal carries are used as inputs to the decoding circuit E in the next decimal digital position (i.e., the hundreds decimal digital position which is not shown) in the same manner that the outputs of D circuit 151 are used as inputs to E circuit 162.

The second category of outputs generated by decoding circuit 152 are used as inputs for the second level decoding circuit E in the same decimal digital position (i.e., for circuit 162). The outputs which go from the first level decoding matrix to the second level decoding circuit in the same digital order (i.e., from circuit 152 to circuit 162) are in the same general form as the outputs from circuits 145, 146, 147 and 148 which are inputs into circuit 152 with the following exception. The outputs from circuits 152 to circuit 162 are in the form of a five digit code which represents counts of "tens," "twenties," "forties," "sixties" and "eighties" (i.e., "ones," "twos," "fours," "sixes" and "eights" which are associated with the tens decimal digit). Note that a count of "sixties" is included whereas the circuits 145 to 148 respectively only produced outputs in a four digit code representing counts of "tens," "twenties," "forties" and "eighties."

The decoding circuit 152 has twenty three storage loops 501 to 523. Each storage loop has a right and left-hand branch path between a current input wire and a current output wire. A constant current is always applied to the current input wire for each storage loop. The four sets of inputs from circuits 145 to 148 (each set having ten lines 421S0 to 421S9) control the storage loops. Depending upon which particular inputs are active, current is directed into either the right or the left-hand current path of each storage loop by the cryotrons which are connected in the storage loops and controlled by the input lines. Current flows in the right-hand path of the storage loop when the particular storage loop has no information (or a "zero") stored therein and in the left-hand current path when the loop has information referred to as a "one" stored therein.

The value of the information stored in the various storage loops when they are placed in the "one" or "on" condition by the outputs of circuits 145, 146, 147 and 148 are indicated in the following table.

Storage loops:                  Value
- 501 _____ 10 (i.e., a "1" in the tens decimal digit).
- 502 to 505 _____ 20 (i.e., a "2" in the tens decimal digit).
- 506 to 509 _____ 40 (i.e., a "4" in the tens decimal digit).
- 510 to 513 _____ 80 (i.e., an "8" in the tens decimal digit).
- 514 to 517 _____ 60 (i.e., a "6" in the tens decimal digit).
- 518, 519 and 521 ___ 100 (i.e., a "10" in the tens decimal digit).
- 520 and 522 _____ 200 (i.e., a "20" in the tens decimal digit).
- 523 _____ 400 (i.e., a "40" in the tens decimal digit).

The various conditions under which information is stored in the loops 501 to 517 is tabulated below in Tables I through IV. For example, information is stored in loop 501 whenever the output of adding circuit 145 indicates a sum of either "ten," "thirty," "fifty," "seventy" or "ninety," that is, when either lines 421S1, 421S3, 421S5, 421S7 or 421S9 from circuit 145 are active thereby indicating counts of "one," "three," "five," "seven" or "nine" in the first binary order of the tens decimal digit. Storage loop 501 stores a "zero" whenever either output 421S0, 421S2, 421S4, 421S6 or 421S8 from adding circuit 145 is active.

The following tables indicate the conditions under which the current in storage loops 501 to 517 is shifted into the left or information storing branch of the respective storage loops. The following tables also indicate the significance or value of the information stored in the various loops. In the following tables the symbol "0" is used to represent that the particular loop is not switched to the information storing condition by the particular input and the symbol "1" is used to indicate that the particular loop is switched to the information storing or "1" condition by the particular input.

Table I

| Inputs Lines from circuit 145 each count having a value of ten (one in the tens decimal digit) | Storage loops activated | | | | |
|---|---|---|---|---|---|
| | 501 with a value of ten (one in the tens decimal digit) | 502 with a value of twenty (two in the tens decimal digit) | 506 with a value of forty (four in the tens decimal digit) | 510 with a value of eighty (eight in the tens decimal digit) | 514 with a value of sixty (six in the tens decimal digit) |
| 421S0 | 0 | 0 | 0 | 0 | 0 |
| 421S1 | 1 | 0 | 0 | 0 | 0 |
| 421S2 | 0 | 1 | 0 | 0 | 0 |
| 421S3 | 1 | 1 | 0 | 0 | 0 |
| 421S4 | 0 | 0 | 1 | 0 | 0 |
| 421S5 | 1 | 0 | 1 | 0 | 0 |
| 421S6 | 0 | 0 | 0 | 0 | 1 |
| 421S7 | 1 | 1 | 1 | 0 | 0 |
| 421S8 | 0 | 0 | 0 | 1 | 0 |
| 421S9 | 1 | 0 | 0 | 1 | 0 |

Table II

| Inputs Lines from circuit 146 each count having a value of twenty (two in the tens decimal digit) | Storage loops activated | | | | |
|---|---|---|---|---|---|
| | 503 with a value of twenty (two in the tens decimal digit) | 507 with a value of forty (four in the tens decimal digit) | 511 with a value of eighty (eight in the tens decimal digit) | 515 with a value of sixty (six in the tens decimal digit) | 518 a carry with a value of one hundred (ten in the tens decimal digit) |
| 421S0 | 0 | 0 | 0 | 0 | 0 |
| 421S1 | 1 | 0 | 0 | 0 | 0 |
| 421S2 | 0 | 1 | 0 | 0 | 0 |
| 421S3 | 0 | 0 | 0 | 1 | 0 |
| 421S4 | 0 | 0 | 1 | 0 | 0 |
| 421S5 | 0 | 0 | 0 | 0 | 1 |
| 421S6 | 1 | 0 | 0 | 0 | 1 |
| 421S7 | 0 | 1 | 0 | 0 | 1 |
| 421S8 | 0 | 0 | 0 | 1 | 1 |
| 421S9 | 0 | 0 | 1 | 0 | 1 |

Table III

| Inputs Lines from circuit 147 each count having a value of forty (four in the tens binary order) | Storage loops activated | | | | | |
|---|---|---|---|---|---|---|
| | 504 with a value of twenty (two in the tens decimal digit) | 508 with a value of forty (four in the tens decimal digit) | 512 with a value of eighty (eight in the tens decimal digit) | 516 with a value of sixty (six in the tens decimal digit) | 519 with a value of one hundred (ten in the tens decimal digit) | 520 with a value of two hundred (twenty in the tens decimal digit) |
| 421S0 | 0 | 0 | 0 | 0 | 0 | 0 |
| 421S1 | 0 | 1 | 0 | 0 | 0 | 0 |
| 421S2 | 0 | 0 | 1 | 0 | 0 | 0 |
| 421S3 | 1 | 0 | 0 | 0 | 1 | 0 |
| 421S4 | 0 | 0 | 0 | 1 | 1 | 0 |
| 421S5 | 0 | 0 | 0 | 0 | 0 | 1 |
| 421S6 | 0 | 1 | 0 | 0 | 0 | 1 |
| 421S7 | 0 | 0 | 0 | 1 | 0 | 1 |
| 421S8 | 1 | 0 | 0 | 0 | 1 | 1 |
| 421S9 | 0 | 0 | 0 | 1 | 1 | 1 |

Table IV

| Inputs Lines from circuit 148 each count having a value of eighty (eight in the tens decimal digit) | Storage loops activitated | | | | | | |
|---|---|---|---|---|---|---|---|
| | 505 with a value of twenty (two in the tens decimal digit) | 509 with a value of forty (four in the tens decimal digit) | 513 with a value of eighty (eight in the tens decimal digit) | 517 with a value of sixty (six in the tens decimal digit) | 521 with a value of one hundred (ten in the tens decimal digit) | 522 with a value of two hundred (twenty in the tens decimal digit) | 523 with a value of four hundred (forty in the tens decimal digit) |
| 421S0 | 0 | 0 | 0 | 0 | 0 | 0 | 0 |
| 421S1 | 0 | 0 | 1 | 0 | 0 | 0 | 0 |
| 421S2 | 0 | 0 | 0 | 1 | 1 | 0 | 0 |
| 421S3 | 0 | 1 | 0 | 0 | 0 | 1 | 0 |
| 421S4 | 1 | 0 | 0 | 0 | 1 | 1 | 0 |
| 421S5 | 0 | 0 | 0 | 0 | 0 | 0 | 1 |
| 421S6 | 0 | 0 | 1 | 0 | 0 | 0 | 1 |
| 421S7 | 0 | 0 | 0 | 1 | 1 | 0 | 1 |
| 421S8 | 0 | 1 | 0 | 0 | 0 | 1 | 1 |
| 421S9 | 1 | 0 | 0 | 0 | 1 | 1 | 1 |

Each of the storage loops 501 to 523 has associated therewith a readout loop respectively designated 524 to 546. Each readout loop has two branches connected between a current input wire and a current output wire. For example, readout loop 524 has a current input wire 524A and a current output wire 524B. Current applied to current input wire of a readout loop flows in the top branch of the respective loop if the associated storage loop is in the "off" condition and current flows through the top branch of the respective readout loop if the associated storage loop is in the "on" condition. The readout loops in turn control cryotrons in adding tree circuits 551 to 555 to produce the outputs which go to circuit 162.

There are five adding trees 551 to 555 in decoding circuit 152. The adding trees 551 to 555 respectively activate the five sets of outputs 551S0 to 551S4, 552S0 to 552S4, 553S0 to 553S4, 554S0 to 554S4 and 555S0 to 555S4. The five sets of outputs from circuit 152 respectively indicate the number of "tens," "twenties," "forties," "sixties" and "eighties" (i.e., respectively "ones," "twos," "fours," "sixes" and "eights" in the tens decimal digit) which are stored in storage loops 501 to 517.

Each of the adding trees 551 to 555 activates its outputs depending upon the inputs from the readout loops 524 to 540 which are associated storage loops 501 to 517. The adding trees 551 to 555 are similar in principle to the adding trees in circuits A and B previously described and therefore no further description of adding trees 551 to 555 is given.

Readout loops 541 to 546 which readout carry storage loops 518 to 523 do not have (in circuit 152) adding tree circuits associated therewith. Readout loops 541 to 546 are directly used as inputs to decoding circuit E in the hundreds decimal digital position (not shown). The manner in which the outputs from readout loops 541 to 546 are handled will be explained when circuit 162 is explained. (I.e., when the decoding circuit E in the tens decimal digital position is explained.)

Circuit 152 operates as follows: all of the current source inputs for the storage loops 501 to 523, the readout loops 524 to 546 and the adding trees 551 to 555 always supply constant currents. When the inputs from circuits 145 to 148 change the circuit first goes through a brief transient period and then settles down with the appropriate outputs active.

DECODING CIRCUIT "E" (FIGURES 6a, 6b, 6c)

Each of the second level decoding circuits E is almost identical to decoding circuit 162 shown in detail in FIGURES 6a, 6b and 6c. The following detailed description will apply particularly to decoding circuit 162; however, it is generally applicable to any decoding circuit E. The differences between decoding circuit 162 and other decoding circuits E will be pointed out.

Decoding circuit 162 which is associated with the tens decimal digit receives inputs 551S0 to 551S1, 552S0 to 552S4, 553S0 to 553S4, 554S0 to 545S4 and 555S0 to 555S4 from decoding circuit 152. Circuit 162 also receives decimal carry inputs from the decoding circuits 151 to 161 which are associated with the units decimal digital order. It should be particularly noted that the input to circuit 162 from circuit 152 is in the form of a count of "tens," "twenties," "forties," "sixties" and "eighties" (i.e., "ones," "twos," "fours," "sixes" and "eights" in the tens decimal digit).

Circuit 162 is composed of four different groups of circuits. First, there are adding tree circuits 601 to 604 (FIGURES 6a and 6c), second there are decoding matrices 605 to 608 (FIGURES 6a and 6b), third, there is a special type of adding tree 609 (FIGURE 6c) and finally, there is the decoding matrix 610 (FIGURE 6c) which produces the final binary coded sum digits for the particular digital order.

One of the functions which the adding trees 601 to 604 perform is to assimilate into the tens decimal order the decimal carries generated by the D and E circuits which are associated with the units decimal digit. The circuits 605 to 608 are used to transfer information from one set of the outputs from decoding circuit 152 (as modified by circuits 601 to 604) along to a succeeding or higher valued set of outputs. For example, a count of forty (four ones in the tens decimal digit) from circuit 601 is transferred to circuit 603 and assimilated as a count of forty (one four in the tens decimal digit). The various transfers will be explained in detail later. Each of the circuits 601 to 609 will now be individually described.

*Circuit 601.*—Circuit 601 (FIGURE 6a) has seven pairs of input lines 601A to 601G. Inputs 601B, 601C and 601D are decimal carry inputs from the decoder D which is in the units decimal digital position and inputs 601E, 601F and 601G are decimal carry inputs from the decoder E which is in the units decimal digital position. Input 601A consists of outputs 551S1 and 551S0 from the decoder 152 (i.e., from the decoder D which is in the same decimal digital position). It should be particularly noted that there are decoding matrices D and E in each decimal digital position. Herein only matrices 152 and 162 (i.e., those in the tens decimal digit) are shown in detail.

Where there are connections between different decoding matrices, the connecting terminals are specifically labeled. For examples, input loop 601B has terminals 541C and 541D which are labeled "From circuit D in previous decimal digit." Circuit 152 (FIGURE 5c) has an output terminal labeled 541C and 541D; however, since the label on the input to circuit 601 indicates that these inputs come from the decoding circuit D in the previous decimal digit it is clear that the terminals on FIGURE 5c are not connected to the terminals on FIGURE 6a. Instead the terminals 541C and 541D shown in FIGURE 6a are connected to decoding circuit 151 which is identical to circuit 152, but which is associated with the units decimal digit.

Each of the inputs 601A to 601G has two lines, current in one line indicates a "one" or "on" condition and current in the other line indicates a "zero" or "off" condition. The actual value of each input is ten or stated differently, a "one" in the first binary order of the tens decimal digit. The input 601A provides two possible current sources for the adding tree 601 and the inputs 601B to 601G determine which of the possible paths through the adding tree is in a low resistance condition.

The output from adding circuit 601 is indicated on output lines 601S1 to 601S7. If none of the inputs to the adding tree 601 are in the "one" or "on" condition, output 601S0 is activated, if one of the inputs to the adding tree 601 is in the "one" or "on" position output 601S1 is activated, etc. until if all seven of the inputs to the adding circuit 601 are in the "one" or "on" condition output 601S7 is activated. The adding tree 601 operates as do the previously explained adding trees and hence no further explanation is given.

*Circuit 602.*—Adding tree 602 (FIGURE 6a) has six sets of inputs 602A to 602F. Inputs 602A are connected to outputs 552S0 to 552S4 from decoding matrix 152, inputs 602B and 602C are connected to decoding matrix D in the previous decimal digital position and input 602F is connected to output 605B of circuit 605. Inputs 602A indicate a sum of from zero to four twenties (twos in the tens decimal digit) from circuit 552 and each of the inputs 602D to 602F indicate a count of zero or one twenty.

Adding tree 602 has nine output lines 602S0 to 602S9, only one of which will be activated at any one time. The output 602S0 to 602S9 respectively indicate counts of from zero to nine twenties. One of the inputs 552S0 to 552S4 supplies current to the circuit and inputs 602B to 602F direct this current to one of the outputs 602S0 to 602S9. Circuit 602 operates as does the previously described adding tree, hence, no further explanation will be given.

*Circuit 603.*—Adding tree circuit 603 (FIGURE 6b) has four sets of inputs 603A to 603D and output lines 603S0 to 603S7. Inputs 602A are connected to outputs 553S0 to 553S4 of adding tree 553 in decoding matrix 152 (i.e., the decoding circuit D in the same decimal digit). Input 603B is a decimal carry having a value of forty which is generated in the decoding matrix D of the units decimal order. Inputs 603C and 603D come from decoding matrices 605 and 606 and they are respectively connected to outputs 606B and 605C. One of the inputs 553S0 to 553S4 supplies current to circuit 603 and this current is directed to one of the outputs 603S0 to 603S7 depending upon the number of inputs 603B to 603D which are in the "one" condition. It should be noted that each input and output of circuit 602 has a value of forty (i.e., four in the tens decimal digit).

*Circuit 604.*—Adding circuit 604 (FIGURE 6b) has three sets of inputs 604A to 604C and outputs 604S0 to 604S4. The inputs 604A are connected to outputs 554S0 to 554S4 from adding tree 554 in circuit 152. Input 604B is connected to output 617B from decoding circuit 607 and input 605C is connected to output 606C from decoding circuit 606. Each of the inputs to and outputs from 604 has a value of eighty (i.e., eight in the tens decimal digit). Circuit 604 operates similarly to the previously described adding trees and no further explanation will be given.

*Circuit 605.*—Decoding circuit 605 (FIGURE 6a) receives eight inputs 601S0 to 601S7 from circuit 601. The lines 601S0 to 601S7 are the outputs of circuit 601 and the inputs to circuit 605. The inputs 601S0 to 601S7 respectively indicate counts of from zero to seventy (i.e., one to seven in the tens decimal digit). Circuit 605 has three pairs of output lines respectively designated 605A to 605C. Output 605A has a value of ten, output 605B has a value of twenty and output 605C has a value of forty. The inputs 601S0 to 601S7 from circuit 601 are decoded into one or more of the outputs 605A to 605C. As previously described with reference to circuit 601, only one out of the eight lines 601S0 to 601S7 is active at any one time.

Each of the outputs from circuit 605 is in a form of a bistable loop circuit which has two superconducting current paths connected between a current input wire and a current output wire similarly to the loop circuit shown in FIGURES 2c and 2d. Each of the paths in superconducting loop circuits 605A to 605B has connected in series therewith a plurality of cryotron gating elements. Each of the inputs 601S0 to 601S7 activates a cryotron gating element in one of the current paths of each of the output loop circuits 605A and 605B. For example, the input 601S0 activates cryotron gating elements in the lower superconducting path of each of the output loops 605A and 605B thereby setting both of the output loops 605A and 605B to the "zero" condition. On the other hand input 601S1 activates a cryotron gating element in the upper path of output loop 605A and in the lower path of output loop 605B thereby setting loop 605A to the "on" condition and loop 605B to the "off" condition. The current from the four inputs 601S0 to 601S3 are combined into the "off" superconducting current path of output loop 605C and the four inputs 601S4 to 601S7 are combined into the "on" superconducting current path of output loop 605. The following table indicates which outputs are set to the "on" condition by each of the various inputs. In the table a "no" means that a particular output is not set to the "on" condition and a "yes" means that a particular output is set to the "on" condition.

*Table 605*

| Input | Value of input | Output 605A (value of ten) | Output 605B (value of twenty) | Output 605C (value of forty) |
| --- | --- | --- | --- | --- |
| 601S0 | 0 | No | No | No |
| 601S1 | 10 | Yes | No | No |
| 601S2 | 20 | No | Yes | No |
| 601S3 | 30 | Yes | Yes | No |
| 601S4 | 40 | No | No | Yes |
| 601S5 | 50 | Yes | No | Yes |
| 601S6 | 60 | No | Yes | Yes |
| 601S7 | 70 | Yes | Yes | Yes |

Since each of the other decoding circuits 606 to 608 operates similarly to the decoding circuit 605 no detailed explanation of the decoding circuits 606 to 608 will be given. However, each of the circuits 606 to 608 will be described generally.

*Circuit 606.*—Decoding circuit 606 (FIGURE 6a) receives ten inputs 602S0 to 602S9 from circuit 602. The ten inputs 602S0 to 602S9 are the outputs of circuit 602. The inputs 602S0 to 602S9 respectively indicate counts of from zero to one hundred and eighty (i.e., from one to nine twos in the tens decimal digit). Only one of the inputs 602S0 to 602S9 is active at any one time. Circuit 606 has five outputs 606A to 606E which have values as follows: Output 606A has a value of twenty, output 606B has a value of forty, output 606C has a value of eighty, output 606D has a value of one hundred and output 606E has a value of sixty. The input 602S0 to 602S9 are respectively decoded into the output 606A to 606E as indicated in the following table. It should be noted that the output terminals of loop 606D are labeled 606CC and 606DD (FIGURE 6b).

*Table 606*

| Input | Value of input | Output 606A (value of twenty) | Output 606B (value of forty) | Output 606C (value of eighty) | Output 606E (value of one hundred) | Output 606F (value of sixty) |
| --- | --- | --- | --- | --- | --- | --- |
| 602S0 | 0 | No | No | No | No | No |
| 602S1 | 20 | Yes | No | No | No | No |
| 602S2 | 40 | No | Yes | No | No | No |
| 602S3 | 60 | Yes | Yes | No | No | No |
| 602S4 | 80 | No | No | Yes | No | No |
| 602S5 | 100 | Yes | No | Yes | No | No |
| 602S6 | 120 | No | Yes | Yes | No | No |
| 602S7 | 140 | Yes | Yes | Yes | No | No |
| 602S8 | 160 | No | No | No | Yes | Yes |
| 602S9 | 180 | Yes | No | No | Yes | Yes |

*Circuit 607.*—Decoder circuit 607 (FIGURE 6b) receives inputs 603S0 to 603S7 from circuit 603. The inputs 603S0 to 603S7 are outputs of circuit 603. The inputs 603S0 to 603S7 respectively have values of from zero to two hundred and eighty (i.e., from zero to seven fours in the tens decimal digit). Circuit 607 has four outputs 607A to 607D having values as follows: Output 607A has a value of forty, output 607B has a value of eighty, output 607C has a value of one hundred and output 607D has a value of sixty. The output terminal of loop 607D are labeled 607CC and 607DD. The inputs 603S0 to 603S7 are decoded into the outputs 607A to 607D as indicated in the following table.

*Table 607*

| Input | Value of input | Output 607A (value of forty) | Output 607B (value of eighty) | Output 607C (value of one hundred) | Output 607D (value of sixty) |
| --- | --- | --- | --- | --- | --- |
| 603S0 | 0 | No | No | No | No |
| 603S1 | 40 | Yes | No | No | No |
| 603S2 | 80 | No | Yes | No | No |
| 603S3 | 120 | Yes | Yes | No | No |
| 603S4 | 160 | No | No | Yes | Yes |
| 603S5 | 200 | Yes | No | Yes | Yes |
| 603S6 | 240 | No | Yes | Yes | Yes |
| 603S7 | 280 | Yes | Yes | Yes | Yes |

*Circuit 608.*—Decoder circuit 608 (FIGURE 6b) receives inputs 604S0 to 604S5 from circuit 604. The inputs 604S0 to 604S5 are outputs of circuit 604. The inputs 604S0 to 604S5 respectively have values of from zero to four hundred (i.e., from one to five eights in the tens decimal digit). Circuit 608 has five outputs 608A to 608E. The five outputs 608A to 608E have values as follows: Output 608A has a value of eighty, output 608B has a value of one hundred, output 608C has a value of sixty, and output 608D has a value of two hundred and output 608E has a value of one hundred and twenty. The output terminals for loop circuits 608B and 608D are labeled 608CC, 608DD, 608EE, and 608FF. The inputs 604S0 to 604S5 from circuit 608 are decoded into outputs 608A to 608E as indicated in the following table.

Table 608

| Input | Value of input | Output 608A (value of eighty) | Output 608B (value of one hundred) | Output 608C (value of sixty) | Output 608C (value of two hundred) | Output 608D (value of one hundred) |
|---|---|---|---|---|---|---|
| 604S0 | 0 | No | No | No | No | No |
| 604S1 | 80 | Yes | No | No | No | No |
| 604S2 | 160 | No | Yes | No | No | No |
| 704S3 | 240 | Yes | Yes | Yes | No | No |
| 604S4 | 320 | No | No | No | Yes | Yes |
| 704S5 | 400 | Yes | No | No | Yes | Yes |

*Circuit 609.*—Decoding circuit 609 (FIGURE 6c) receives inputs from decoding circuits 606 to 608 and from the adding tree 555 in decoding circuit 500 and it decodes these inputs into thirty-eight outputs. The outputs of circuit 609 are designated on FIGURE 6c by capital letters A to Z and AA to LL. However, consistent with the numbering scheme used throughout the specification these outputs are referred to as outputs 609A to 609Z and 609AA to 609LL. The 609 was not placed before the letters in FIGURE 6c because of space limitation.

Adding circuit 609 is merely an adding tree which utilizes the outputs 555S0 to 555S4 from adding tree 555 in circuit 152 as five current inputs. It should be noted that only one of the outputs 555S0 to 555S4 will be active at any one time. The current from each of the lines 555S0 to 555S4 has a plurality of possible paths through adding tree 609. The particular path which the current will take through the adding tree 609 to the output 609A to 609LL will depend upon inputs 606E, 607D, 608C, 608E, 608A, 607A and 606A which come from circuits 606, 607 and 608. The particular output which is activated is the sum of the number represented by the input which comes from adding tree 555 and the sum of the inputs from circuits 606, 607 and 608. The thirty-eight outputs 609A to 609Z and 609AA to 609LL have the following values:

| | | | |
|---|---|---|---|
| 609A | 0 | 609T | 180 |
| 609B | 20 | 609U | 200 |
| 609C | 40 | 609V | 200 |
| 609D | 60 | 609W | 240 |
| 609E | 80 | 609X | 260 |
| 609F | 100 | 609Y | 180 |
| 609G | 120 | 609Z | 200 |
| 609H | 140 | 609AA | 220 |
| 609I | 60 | 609BB | 240 |
| 609J | 80 | 609CC | 260 |
| 609K | 100 | 609DD | 280 |
| 609L | 120 | 609EE | 300 |
| 609M | 140 | 609FF | 320 |
| 609N | 160 | 609GG | 240 |
| 609O | 180 | 609HH | 260 |
| 609P | 200 | 609II | 280 |
| 609Q | 120 | 609JJ | 300 |
| 609R | 140 | 609KK | 320 |
| 609S | 160 | 609LL | 340 |

The inputs to circuit 609 have the following values:

| Inputs: | The values of a signal on the input |
|---|---|
| 554S0 | 0 |
| 554S1 | 60 |
| 554S2 | 120 |
| 554S3 | 180 |
| 554S4 | 240 |
| 606E | 60 |
| 607D | 60 |
| 608C | 60 |
| 608E | 120 |
| 608A | 80 |
| 607A | 40 |
| 606A | 20 |

It should be noted that the "on" condition is indicated by current in the top line of input loops 606E, 607D, 608C, 608E, 608A, 607A and 606A.

As can be seen from the above chart not all of the inputs to circuit 609 have the same value. The current inputs 555S0 to 555S4 for the adding tree 609 have values which differ from each other by "sixty." The horizontal input loop which establishes a path from the current inputs 555S0 to 555S4, to the output 609A to 609LL have values which range from twenty to one hundred and twenty as given above. Furthermore, certain combinations of inputs are not possible, for example, input 555S4 and input 606E cannot both be simultaneously active due to the nature of the previous circuitry. The reason for this can be determined by examining the decoding circuits 152, 602 and 606. In order for input 606E to be in the "on" condition line 602S8 or line 602S9 must be active, and in order for lines 602S8 or 602S9 to be active either lines 552S3 or 552S4 must be active. In order for lines 552S3 or 552S4 to be active, at least three of the loop circuits 502 to 505 must be in the one condition. It should be noted that the various inputs from circuits 401 to 404 which switch the loop circuits 502 to 505 on the "on" condition, are not the same inputs which switch any of the loop circuits 514, 515, 516 or 517 to the "on" condition. Hence, whenever outputs 552S3 or output 552S4 are active, either output 555S0 or output 555S1 must be active, since at least three of the loop circuits 514 to 517 must be in the "off" condition when any three of the loop circuits 502 to 505 are in the "on" condition. It can therefore be seen that whenever the loop 606E is in the "on" condition there will be current in either input 555S0 or 555S1 and the current can be switched from current path 609A to current path 609I or from current path 609I to current path 609Q by the cryotrons in paths 609A, 609I and 609Q which loop circuit 606E controls.

Circuit 609 operates similarly to the other previously described adding trees even though it is not a symmetrical adding tree as were those previously described. The reason that circuit 609 is not symmetrical is that the various inputs to circuit 609 do not all have the same values and because certain of the horizontal inputs which establish current paths through the circuit cannot be active when certain of the current sources are active as previously described with reference to input 606E and current sources 555S0 and 555S1.

The circuit 609 has five possible current inputs 555S0 to 555S4. Inputs 606E, 607D, 608C, 608E, 608A, 607A and 606A establish a current path from each of these inputs to one of the outputs 609A to 609LL. Inputs 606E, 607D ... 606A establish the various current paths through the decoding circuit 609 by controlling cryotrons which are located in the various paths through the circuit. Since each of the inputs 606E, 607D, 608C, 608A, 607A, 606A do not have the same value they do not shift the current like amounts in the adding tree. For example, input 606E which has a value of sixty shifts the input current from line 609A to line 609I whereas input 606A which has a value of twenty merely shifts the current from line 609A to 609B. Furthermore, the adding circuit 609 has more than one output which has the same values. For example, output 609I which would be active if current input 555S1 is active and none of the inputs 606E, 607D, 608C, 608E, 608A, 607A and 606A are active has the same value as output 609D which is active when (1) current input 555S0 is "on," (2) inputs 606E, 607D, 608C, 608E and 608A are "off" and (3) inputs 607A and 606A are "on." Since, except for the differences pointed out above, adding tree circuit 609 is similar to the previously described adding trees no further explanation thereof will be given.

The thirty-eight outputs 609A to 609Z and 609AA to 609LL of adding circuit 609 are combined into eighteen inputs 610A to 610R between circuit 609 and 610. The particular outputs from circuit 609 which activate each of the inputs 610A to 610R of circuit 610 are tabulated below:

| Inputs to circuit 610: | Activated by outputs from circuit 609 |
|---|---|
| 610A | 609A |
| 610B | 609B |
| 610C | 609C |
| 610D | 609D, 609I |
| 610E | 609E, 609J |
| 610F | 609F, 609K |
| 610G | 609G, 609L, 609Q |
| 610H | 609H, 609M, 609R |
| 610I | 609N, 609S |
| 610J | 609O, 609T, 609Y |

| Inputs to circuit 610: | Activated by outputs from circuit 609 |
|---|---|
| 610K | 609P, 609U, 609Z |
| 610L | 609V, 609AA |
| 610M | 609W, 609BB, 609GG |
| 610N | 609X, 609CC, 609HH |
| 610O | 609DD, 609II |
| 610P | 609EE, 609JJ |
| 610Q | 609FF, 609KK |
| 610R | 609LL |

*Circuit 610.*—The inputs 610A to 610R of circuit 610 are decoded into seven outputs 610S to 610Y. It should be noted that only one of the inputs 610A to 610R of circuit 610 can be active at any one time. The value of the various inputs 610A to 610R is given below. The various outputs which inputs 610A to 610R activate are tabulated below. Circuit 610 operates similarly to circuits 605 to 608 and hence no explanation is given. It should be noted that the output terminals of loop circuits 610S and 610T are respectively designated 611CC, 610DD, 610EE and 610FF.

Since one and only one of the outputs 610FF to 610KK is active at any one time it can be seen that the storage loops FS2, FS3 and FS4 are always set to either the "on" or to the "off" condition. The particular state to which the outputs 610GG to 610KK set the loops FS2, FS3 and FS4 is set out below.

| Input line | Output loop FS2 | Output loop FS3 | Output loop FS4 |
|---|---|---|---|
| 610U | Off | Off | Off |
| 610V | On | Off | Off |
| 610W | Off | On | Off |
| 610X | On | On | Off |
| 610Y | Off | Off | On |

It should be noted that decoding circuit E which is shown in detail in FIGURES 6a, 6b and 6c only has provision for accepting three decimal carries of value ten from the second level decoding circuit E in the units decimal digital position. That is, circuit 601 has provision on the three sets of lines 601E to 601G for accepting three decimal carries each having a value of ten from circuit E which is in the units decimal digital position. On the other hand the circuit 600 which is shown in detail in FIGURES 6a, 6b and 6c generates four decimal carries each of which has a value of ten. These signals are produced at output terminals (1) 608CC–608DD, (2) 610CC–610DD, (3) 607CC–607DD and (4) 606CC–606DD.

In order to assimilate the extra decimal carry, the decoding circuit E associated with the hundred decimal digit would have to have one additional set of inputs to the circuit 601 in that decoding circuit E. Hence, the circuit 601 in the decoding circuit E in the hundred decimal digit would have ten outputs instead of the nine outputs shown in FIGURE 6a. In order to accommodate for this extra output from circuit 601, 605 would have an extra output

| Input | Value of input | Output 610S (value of one hundred) | Output 610T (value of two hundred) | Output 610U (value of zero) | Output 610V (value of twenty) | Output 610W (value of forty) | Output 610X (value of sixty) | Output 610Y (value of eighty) |
|---|---|---|---|---|---|---|---|---|
| 610A | 0 | No | No | Yes | No | No | No | No |
| 610B | 20 | No | No | No | Yes | No | No | No |
| 610C | 40 | No | No | No | No | Yes | No | No |
| 610D | 60 | No | No | No | No | No | Yes | No |
| 610E | 80 | No | No | No | No | No | No | Yes |
| 610F | 100 | Yes | No | Yes | No | No | No | No |
| 610G | 120 | Yes | No | No | Yes | No | No | No |
| 610H | 140 | Yes | No | No | No | Yes | No | No |
| 610I | 160 | Yes | No | No | No | No | Yes | No |
| 610J | 180 | Yes | No | No | No | No | No | Yes |
| 610K | 200 | No | Yes | Yes | No | No | No | No |
| 610L | 220 | No | Yes | No | Yes | No | No | No |
| 610M | 240 | No | Yes | No | No | Yes | No | No |
| 610N | 260 | No | Yes | No | No | No | Yes | No |
| 610O | 280 | No | Yes | No | No | No | No | Yes |
| 610P | 300 | Yes | Yes | Yes | No | No | No | No |
| 610Q | 320 | Yes | Yes | No | Yes | No | No | No |
| 610R | 340 | Yes | Yes | No | No | Yes | No | No |

Each of the digits of the final sum has associated therewith a loop circuit similar to the loop circuits shown in FIGURE 2d. Since the specific decoding circuit E shown in FIGURES 6a, 6b and 6c is the decoding circuit 600, the four storage loops shown in FIGURE 6c are the four storage loops associated with the four binary digits which are used to represent the tens decimal digit. The four storage loops are respectively designated FS1 to FS4. Loop FS1 is associated with the first binary order in the tens decimal digits, loop FS2 is associated with the second binary order in the tens decimal digit, loop FS3 is associated with the third binary order in the tens decimal digit, and loop FS4 is associated with the fourth binary order in the tens decimal digit.

The output loop 605A from circuit 605 places the storage loop FS1 in either the "zero" or the "one" condition by activating either a cryotron in left path or a cryotron in its right path. Each of the outputs 610GG to 610KK from circuit 610 conditions each of the storage loops FS2, FS3, FS4 to the "on" or "off" conditions.

loop which would provide an extra input to circuit 602. Circuit 602 in turn would have six levels instead of the five levels shown and likewise each of the circuits 606, 603, 607, 604 and 603 would have one additional level of circuitry. The circuit 608 in the decoding circuit E in the hundreds decimal digital position would therefore have an extra output loop and it would produce one more decimal carry output than does the circuit 608 shown in FIGURE 6b. The addition of one extra level of logic on each of the circuits 601 to 608 would follow straight forward from the detailed explanation given of the circuitry in FIGURES 6a, 6b and 6c and no further explanation thereof will be given.

It should be noted that there will be one additional decimal carry between each succeeding decimal digit. That is, there are five decimal carries from the decoding circuit E in the units decimal digit to the decoding circuit E in the tens decimal digit. There are six decimal carries from the decoding circuit E in the tens decimal digit to the decoding circuit E in the hundreds decimal digit. The number of carries from each decoding circuit E to the next decoding circuit E would continue to increase with each additional decimal digital position. The circuitry of the present invention could be considerably simplified by combining some of these carries in an additional level of decoding. That is, instead of separately propagating a plurality of carries between adjacent decimal digits, the carries between the decimal digital positions could be first combined into a lesser number of higher order carries. Then, instead of only propagating carries from one decimal digital position to an adjacent decimal digital position, carries could be propagated from one decimal digital position to decimal digital positions which are removed by several digital positions. Thus, for example, a carry generated in the thousands digital position might be propagated to the millions decimal digital position rather than merely to the ten thousandths decimal digital positions as would be the case if the scheme shown herein is continued for a large number of digital positions.

Since the present invention is directed at the general philosophy of organizing a binary coded decimal digital adder, the various manners in which the decoder circuits D and E could be simplified by providing a further hierarchy of circuits in the higher level digital positions is not fully pursued herein but it will be obvious to those skilled in the art that such simplifications could be made.

All of the constant current inputs in circuits 102 to 106 are constantly active. The circuitry goes through a slight transient condition immediately after different numbers are entered in the storage loops in circuits 102 to 105 (for example, into storage loops 331 to 339 and 431 to 439). However, after the transients have ended the circuit settles down with the correct result appearing at the output.

TRANSLATOR

The principle upon which the translator of the present invention operates is that in order to translate a binary number into the corresponding binary coded decimal number, one merely need take the value of each digit of the binary number which is a "one," express this value in binary coded decimal form and then sum all of the values so obtained. With the present invention the value of each binary order (expressed in binary decimal form) is stored in one of the registers in circuits 102 to 105. Each "one" in the binary number which is to be translated selectively reads out, into the associated adding circuitry, the register in circuits 102 to 105 which has stored therein the value of the particular digit expressed in binary coded decimal form. Hence, for each "one" in the binary number which is to be translated the equivalent value expressed in binary coded decimal form is read into the adding circuitry. The sum output from the adding circuitry is therefore the binary number expressed in binary coded decimal form.

In order to use the previously described adder circuitry as a translator the readout circuits for the thirty-six registers in circuits 102, 103, 104 and 105 are connected as shown in FIGURE 7 and the numbers $2^1, 2^3, 2^4, \ldots 2^{36}$ are stored in word positions N1 to N36 in the register in circuits 102 to 105. It will be noted that the numbers which are stored in the word positions N1 to N36 are respectively the values of the first thirty-six binary orders.

As previously explained, circuit 102 includes nine memory registers which respectively store the numbers N1 to N9, circuit 103 includes nine memory registers which respectively store the numbers N10 to N18, circuit 104 includes nine memory registers which respectively store the numbers N19 to N27 and circuit 105 includes nine memory registers which respectively store the numbers N28 to N36.

FIGURE 7 shows four circuits 102', 103', 104' and 105' which are similar to the previously described circuits 102, 103, 104 and 105 shown in FIGURE 1. The differences between circuits 102' to 105' and circuits 102 to 105 will be specifically pointed out. Also shown in FIGURE 7 is an input circuit 750 which has thirty-six sets of terminals 701 to 736.

The thirty-six binary digits of a binary number which is to be translated into binary coded decimal form respectively activate the inputs 701 to 736. If a particular binary digit is a "one" the top input in the associated pair of inputs is activated. If a binary digit is a "zero" the bottom input of the associated pair of inputs is activated. There is one pair of inputs in circuit 750 for each of the thirty-six registers in circuits 102 to 105. When the top input of a particular pair of inputs is activated, the associated register in circuits 102 to 105 is read into the previously described adding circuitry and when the bottom input of a particular pair of inputs in circuit 750 is activated the associated register in circuits 102 to 105 is not read into the previously described adding circuitry.

The differences between circuits 102' to 105' and circuits 102 to 105 is shown by showing in detail the storage loops 331E and 331F and the associated readout loops 341E and 341F which are associated with the first two positions of the first register in circuit 102'. Storage loops 331E and 331F and likewise readout loops 341E and 341F are respectively in circuits 111 and 112. For ease in illustration FIGURE 7 does not show any of the previously described adding circuitry. Naturally, it should be understood that each of the readout loops 341E and 341F like each of the other readout loops activates part of one of the previously described adding circuits. The deletion of the adding circuitry is indicated in FIGURE 7 by the dotted portion of each of the readout loops 341E and 341F.

As previously described when a readout loop reads a "one" from the associated storage loop, there is current in the bottom current path of the associated readout loop and when a readout loop reads a "zero" from the associated storage loop there is current in the top current path of the associated readout loop. Each of the readout loops in circuits 102' to 105' has two cryotrons associated therewith which the corresponding readout loops in circuits 102 to 105 did not have. The two additional cryotrons associated with readout loop 341E are designated 341E0 and 341E1 and the two additional cryotrons associated with readout loop 341F are the cryotrons 341F0 and 341F1.

Cryotrons 341E1 and 341F1 are respectively connected in series between the zero and the one paths of the associated readout loops. When cryotrons 341E1 and 341F1 are resistive and cryotrons 341E0 and 341F0 are superconductive, the associated readout loops operate as if the cryotrons 341E1, 341F1, 341E0 and 341F0 were not present. When cryotrons 341E1 and 341F1 are superconductive and cryotrons 341E0 and 341F0 are resistive, current can only flow in the zero path of the associated readout loop (i.e., in the zero path of the dotted portion of the associated readout loop which is the portion of the readout loop which activates the adding circuitry).

The control line for cryotrons 341E1 and 341F1 and likewise the control line for each of the similarly placed cryotrons in the other readout loops associated with the first register in circuit 102' are connected to the upper input terminal in input circuit 750. The control line for cryotrons 341E0 and 341F0 and likewise the control line for each of the other similarly placed cryotrons in the other readout loops associated with the first register in circuit 102' are connected to the bottom input terminal of the associated pair of inputs in input circuit 750. Hence, when the top input terminal of the pair of input terminals 701 is activated, the readout loops 341E, 341F and likewise each of the other readout loops associated with the first register in circuit 102' operate in the normal manner as previously described with respect to the adder circuitry and hence, the number stored in the first register is read into the adding circuitry. However, when the bottom input terminal of the pair of input terminals 701 is activated each of the readout loops associated with the first register are placed in the zero condition and hence the information in the first register in circuit 102 is not read into the adding circuitry.

Each of the other readout loops have circuitry similar to that shown whereby when the top terminal of any pair of terminals in circuit 750 is activated information in the associated register in circuits 102′ to 105′ is read into the adding circuitry and when the bottom terminal of a pair of terminals in input circuit 750 is activated the information stored in the associated register in circuits 102′ to 105′ is not read into the associated adding circuitry. The additional circuitry shown merely inhibits the readout of selected registers in accordance with inputs from circuit 750.

From the above description it can be seen that if the appropriate numbers are stored in the various registers and if the digits of a binary number which are in the "one" state activate the top terminal of the associated pairs of input terminals in circuit 750 and if the binary digits of a number which are in the "zero" state activate the bottom input terminal of the associated pairs of input terminals in circuitry 750 the binary coded decimal equivalent of the binary number will appear on the sum output line of the previously described adder.

No cryotrons are shown for storing information in the storage loops of the various registers since such circuitry is well known in the art. Furthemore, it should be understood that a read only memory could be used for the translator instead of a memory which can be written into.

The embodiment of the invention specifically shown herein relates to a device for converting from numbers expressed in the binary code form (a single code) into numbers expressed in binary coded decimal form (a dual code form). Naturally it should be understood that devices employing the identical principles could be embodied for converting from any single code into any dual form code.

While the invention has been particularly shown and described with reference to preferred embodiments thereof, it will be undertsood by those skilled in the art that the foregoing and other changes in form and details may be made therein without departing from the spirit and scope of the invention.

What is claimed is:

1. In a binary coded decimal adder for producing the sum of a plurality of numbers wherein each decimal digit of each number is represented by four binary orders respectively having values of "one," "two," "four" and "eight," said numbers being divided into groups the first group having eighteen numbers and each other group having nine numbers, a binary digit input means for each binary order of each number, carry input means associated with each binary order of each group of numbers, adding means associated with each binary order of each group of numbers, said adding means responsive to the associated carry input means and to the associated binary digit input means for producing the sum thereof, said means having twenty provisional sum output means respectively associated with provisional sums of zero through nineteen, means associated with each binary order in each group of numbers responsive to the provisional sum output means associated with provisional sums of ten through nineteen for activating the carry input means associated with the same group of numbers and with the corresponding binary order of the next higher decimal digit, actual sum output means associated with each adding means, said actual sum output means having ten outputs respectively associated with sums of zero through nine, each actual sum output means being responsive to two provisional sum output means, one respectively in the group of provisional sum output means zero to nine and one respectively in the group of provisional sum output means ten through nineteen, a first decoding means associated with each decimal digit for decoding the actual sum output from the adding means associated with the "one," "two," "four," and "eight" binary digital position of the last group of numbers in the respective decimal digit into a "one," "two," "four," "six" and "eight" code and carries into the next decimal order, said first decoding means including carry output means, five sets of output means respectively associated with values of "one," "two," "four," "six" and "eight," and means for selectively activating said output means in response to the associated actual sum output means, sum output means associated with each decimal digit for manifesting in binary coded decimal form the respective decimal sum digits, second decoding means associated with each decimal digit having second decoder carry output means, means to activate said second decoder output means and means to activate the sum output means associated with the respective decimal digit, said second decoding means being responsive to the output means of the first decoding means associated with the same decimal digit, and to carry output means of first and second decoding means associated with the next lower decimal order.

2. In a binary coded decimal adder for producing the sum of a plurality of numbers wherein each decimal digit of each number is represented by four binary orders respectively having values of "one," "two," "four" and "eight,"

a binary digit input means for each binary order of each number, carry input means associated with each binary order, adding means associated with each binary order, said adding means responsive to the associated carry input means and to the associative binary digit input means for producing the sum thereof, said means having twenty provisional sum output means respectively associated with provisional sums of zero through nineteen, means associated with each binary order responsive to the provisional sum output means associated with provisional sums of ten through nineteen for activating the carry input means associated with the corresponding binary order of the next higher decimal digit, actual sum output means associated with each adding means, said actual sum output means having ten outputs respectively associated with sums of zero through nine, each actual sum output means being responsive to two provisional sum output means, one respectively in the group of provisional sum output means zero to nine and one respectively in the group of provisional sum output means ten through nineteen, a plurality of decimal carry input means associated with each decimal digit, a first decoding means associated with each decimal digit for decoding the actual sum output from the adding means associated with the "one," "two," "four" and "eight" binary digital position in the respective decimal digit into a "one," "two," "four," "six" and "eight" code and carries into the next decimal order, said first decoding means including carry output means connected to activate the carry input means of the next decimal digit, five sets of first decoder output means respectively associated with values of "one," "two," "four," "six" and "eight," and means for selectively activating said output means in response to the associated actual sum output means, sum output means associated with each decimal digit for manifesting in binary coded decimal form the respective decimal sum digits, second decoding means associated with each decimal digit responsive to the first decoder means of the first decoding means associated with the same decimal digit, and to associated decimal carry input means for activating said decimal carry, input means in the next higher decimal digital position and for activating the sum output means associated with the respective decimal digit.

3. In a binary coded decimal adder for producing the sum of a plurality of numbers wherein each decimal digit of each number is represented by four binary orders respectively having values of "one," "two," "four" and "eight," said numbers being divided into groups the first group having eighteen numbers and each other group having nine numbers, a binary digit input means for each binary order of each number, carry input means associated with each binary order of each group of numbers, adding means associated with each binary order of each group of numbers, said adding means responsive to the associated carry input means and to the associated binary digit input means for producing the sum thereof, said means having twenty provisional sum output means respectively associated with provisional sums of zero through nineteen, means associated with each binary order in each group of numbers responsive to the provisional sum output means associated with provisional sums of ten through nineteen for activating the carry input means associated with the same group of numbers and with the corresponding binary order of the next higher decimal digit, actual sum output means associated with each adding means, said actual sum output means having ten outputs respectively associated with sums of zero through nine, each actual sum output means being responsive to two provisional sum output means, one respectively in the group of provisional sum output means zero to nine and one in the group of provisional sum output means ten through nineteen, decoding means associated with each decimal digit for decoding the actual sum output from the adding means associated with the various binary orders into the binary coded decimal sum digits and into decimal carries, said decoding means being responsive to the actual sum output means for the adding means in the associated decimal digit and to decimal carries from lower order decimal digits.

4. In an adder for producing the sum of a plurality of numbers which are represented in a mixed code which has a plurality of orders of a second code representing each order of a first code, said numbers being divided into a plurality of groups from a first to a last, each group having a plurality of numbers, a plurality of digit input means for each number, one for each order of said second code carry input means associated with each order of said first code for each group of numbers, adding means associated with each order of said second code in each group of numbers, said adding means responsive to the associated carry input means and to the associated number input means for producing the sum thereof, said means having a plurality of provisional sum output means, means associated with each order of said second code in each group of numbers responsive to selected provisional sum output means for activating the carry input means associated with the corresponding order of said second code in the next higher position of said first code in the same group of numbers, actual sum output means associated with each adding means, said actual sum output means having a plurality of outputs selectively associated with the provisional sum output means of the same adding means, decoding means responsive to the actual sum output from the adding means associated with the last group of numbers for generating the final sum digits.

5. In a binary coded decimal adder which produces the sum of a plurality of numbers wherein each decimal digit of each number is represented by four binary orders respectively having values of "one," "two," "four," and "eight,"

an adding tree associated with each binary order of said number, said adding trees having one level for each of said numbers, and carry assimilate level for each nine numbers, said adding tree having decoding means for generating a decimal carry after each ten levels, carry means associated with each of said decoding means for carrying into a carry assimilate level of an adding tree in a corresponding binary order of the next higher decimal digit, decoding means in each decimal digit responsive to the four adding trees in the associated decimal digit and to decimal carries from lower order decimal digits, said decoding means including means for generating the binary coded sum digits for the associated decimal digital position and means for generating decimal carries to higher decimal positions.

6. In a device for adding a plurality of numbers, each of said numbers having a plurality of orders each order having a different value, said numbers being arranged in a plurality of groups from a first to a last, a plurality of adding means, one for each order in each group of numbers, each of said adding means having a carry output and a plurality of sum outputs, said carry output representing a carry having a value some multiple of the associated order and each sum output representing a particular sum, a plurality of means for propagating carries, one for each of said groups of words, each of said means including means for propagating carries between nonadjacent orders, each of said adding means except the adding means associated with the first group of numbers being responsive to carry output of adding means associated with lower order positions of the same group of numbers and to the sum outputs of the adding means associated with the corresponding order of the previous group of numbers, and decoder means responsive to the sum output means for the adding means associated with the last group of numbers for generating the sum digits for each order.

7. In a device for translating a binary number having either a "one" or a "zero" in the various binary orders thereof into a binary coded decimal form wherein each decimal digit is represented by four binary orders respectively having values of "one," "two," "four," and "eight," each binary order of each decimal digit having the value of "one" or "zero,"

means associated with each binary order of the number to be translated, for storing the number which is the binary coded decimal equivalent of the value of the associated binary digit, said binary coded decimal numbers being divided into groups, the first group having eighteen numbmers and each other group having nine numbers, a binary digit output means for each binary order of each number, said output means responsive to the digit of the associated binary coded decimal number and the associated digit of the binary number to be translated, carry input means associated with each binary order of each group of binary coded decimal numbers, adding means associated with each binary order of each group of binary coded decimal numbers, said adding means responsive to the associated carry input means and to the associated binary digit output means for producing the sum thereof, said means having twenty provisional sum output means respectively associated with provisional sums of zero through nineteen, means associated with each binary order in each group of numbers responsive to the provisional sum output means associated with provisional sums of ten through nineteen for activating the carry input means associated with the same group of numbers and with the corresponding binary order of the next higher decimal digit, actual sum output means associated with each adding means, said actual sum output means having ten outputs respectively associated with sums of zero through nine, each actual sum output means being responsive to two provisional sum output means, one respectively in the group of provisional sum output means zero to nine and one respectively in the group of provisional sum output means ten through nineteen.

a first decoding means associated with each decimal digit for decoding the actual sum output from the adding means associated with the "one," "two," "four" and "eight" binary digital position of the last group of numbers in the respective decimal digit into a "one," "two," "four," "six" and "eight" code and carries into the next decimal order, said first decoding means including carry output means, five sets of output means respectively associated with values of "one," "two," "four," "six" and "eight" and means for selectively activating said output means in response to the associated actual sum output means, sum output means associated with each decimal digit for manifesting in binary coded decimal form the respective decimal sum digits, second decoding means associated with each decimal digit having second decoder carry output means, means to activate said second decoder output means and means to activate the sum output means associated with the respective decimal digit, said second decoding means being responsive to the output means of the first decoding means associated with the same decimal digit, and to carry output means of first and second decoding means associated with the next lower decimal order.

8. In a device for translating numbers represented in a binary form into numbers represented in a binary coded decimal form, said binary numbers having a plurality of decimal positions, storage means, one for each digit of the binary number, for storing the binary coded decimal equivalent of the value of the associated binary digit, adding means associated with each binary order of said binary coded decimal numbers for generating the sum of the digits of all of the digits in the associated order, each adding means including adder output means, said adding means including means for generating decimal carries each of said decimal carries having a value ten times the value of the associated binary order, means for propagating decimal carries from each binary order to the corresponding binary order in the next higher decimal digit, means in each of said adding means except the adding means associated with the lowest order decimal digit for assimilating decimal carries from the corresponding binary order of the next lower decimal digit, decoder means associated with each decimal digital position, responsive to the adder output means of the adding means associated with the binary orders of the respective decimal digital position and to decimal carries from lower order decimal digits, for generating the binary coded decimal sum digits for the respective decimal digital position.

9. In a device for adding a plurality of binary coded decimal numbers, said numbers having a plurality of decimal digits, each decimal digit having four binary orders, adding means associated with each binary order of said numbers for generating the sum of the digits of all of the digits in the associated order, each adding means including adder output means, said adding means including means for generating decimal carries each of said decimal carries having a value ten times the value of the associated binary order, means for propagating decimal carries from each binary order to the corresponding binary order in the next higher decimal digit, means in each of said adding means except the adding means associated with the lowest order decimal digit for assimilating decimal carries from the corresponding binary orders of the next lower decimal digit, decoder means associated with each decimal digit position, responsive to the adder output means of the adding means associated with the binary orders of the respective decimal digital position and to decimal carries from lower order decimal digits, for generating the binary coded decimal sum digits for the respective decimal digit position, wherein each of said adder means has nine outputs respectively associated with sums of from one to nine times the value of the binary order with which the particular adder circuit is associated, and wherein said decoder includes first means responsive to the outputs of each of the adding means in the associated decimal digit for decoding each output from the adding means in the associated decimal digit into counts of "one," "two," "four," "six" and "eight" times the value of the decimal digit with which the particular decoder is associated and decimal carries having a value which is a multiple of the value of the particular decimal digit, five adding means for respectively summing the "ones," "twos," "fours," "sixes" and "eights" generated by said first means, and means responsive to said five adding means for generating the binary coded sum digits for the particular decimal digit and decimal carries having values some multiple of the value of the particular decimal digit.

References Cited by the Examiner

UNITED STATES PATENTS

| | | | |
|---|---|---|---|
| 2,830,758 | 4/58 | Gloess | 235—155 |
| 2,860,327 | 11/58 | Campbell | 235—155 X |
| 2,906,458 | 9/59 | Svoboda | 235—174 |
| 2,907,526 | 10/59 | Havens | 235—174 |
| 2,923,471 | 2/60 | Triman et al. | 235—155 |

MALCOLM A. MORRISON, *Primary Examiner.*